US012255401B2

(12) United States Patent
Lin et al.

(10) Patent No.: US 12,255,401 B2
(45) Date of Patent: Mar. 18, 2025

(54) ANTENNA MODULE AND ELECTRONIC DEVICE

(71) Applicants: GUANGDONG OPPO MOBILE TELECOMMUNICATIONS CORP., LTD., Guangdong (CN); HUIZHOU SPEED WIRELESS TECHNOLOGY CO., LTD., Guangdong (CN)

(72) Inventors: Po-Wei Lin, Guangdong (CN); Si Li, Guangdong (CN); Chenwu Yu, Guangdong (CN); Zhanyi Qian, Guangdong (CN); Qinfang Li, Guangdong (CN); Guannan Tan, Guangdong (CN)

(73) Assignees: GUANGDONG OPPO MOBILE TELECOMMUNICATIONS CORP., LTD., Guangdong (CN); HUIZHOU SPEED WIRELESS TECHNOLOGY CO., LTD., Guangdong (CN)

( * ) Notice: Subject to any disclaimer, the term of this patent is extended or adjusted under 35 U.S.C. 154(b) by 353 days.

(21) Appl. No.: 17/933,627

(22) Filed: Sep. 20, 2022

(65) Prior Publication Data

US 2023/0011271 A1 Jan. 12, 2023

Related U.S. Application Data

(63) Continuation of application No. PCT/CN2021/079664, filed on Mar. 9, 2021.

(30) Foreign Application Priority Data

Apr. 30, 2020 (CN) ......................... 202010370756.0

(51) Int. Cl.

*H01Q 1/52* (2006.01)
*H01Q 1/24* (2006.01)
(Continued)

(52) U.S. Cl.

CPC ............... *H01Q 21/08* (2013.01); *H01Q 1/24* (2013.01); *H01Q 1/48* (2013.01); *H01Q 5/307* (2015.01); *H01Q 9/045* (2013.01); *H01Q 9/065* (2013.01)

(58) Field of Classification Search

CPC ........... H01Q 21/08; H01Q 1/24; H01Q 1/48; H01Q 5/307; H01Q 9/045; H01Q 9/065;
(Continued)

(56) References Cited

U.S. PATENT DOCUMENTS

2007/0080878 A1 4/2007 McLean
2007/0210976 A1 9/2007 Luk et al.
(Continued)

FOREIGN PATENT DOCUMENTS

CN 103682678 3/2014
CN 105140628 12/2015
(Continued)

OTHER PUBLICATIONS

CNIPA, Notification to Grant Patent Right for Invention for CN Application No. 202010370756.0, Jul. 25, 2022.
(Continued)

*Primary Examiner* — David E Lotter
(74) *Attorney, Agent, or Firm* — Hodgson Russ LLP

(57) ABSTRACT

An antenna module includes a first antenna layer, including at least one main radiation unit including at least two main radiation patches symmetrically arranged and spaced apart from each other and at least one feeder portion located at or corresponds to a gap between adjacent two of the main radiation patches; a second antenna layer, stacked with the first antenna layer and including a reference ground arranged opposite to the main radiation patches and at least one microstrip insulated from the reference ground; at least one first electrically conductive member, electrically connected
(Continued)

to the main radiation patches and the reference ground; and at least one second electrically conductive member, with an end being electrically connected to the feeder portion and another end being electrically connected to another end of the microstrip. An end of the microstrip is electrically connected to a radio frequency transceiver chip.

20 Claims, 13 Drawing Sheets

(51) Int. Cl.

| | |
|---|---|
| ***H01Q 1/48*** | (2006.01) |
| ***H01Q 5/307*** | (2015.01) |
| ***H01Q 9/04*** | (2006.01) |
| ***H01Q 9/06*** | (2006.01) |
| ***H01Q 21/08*** | (2006.01) |

(58) Field of Classification Search
CPC .......... H01Q 1/38; H01Q 5/364; H01Q 1/523; H01Q 1/243; H01Q 5/335; H01Q 5/40; H01Q 19/108; H01Q 21/24; H01Q 1/50; H01Q 1/521; H01Q 5/50; H01Q 23/00
See application file for complete search history.

(56) References Cited

U.S. PATENT DOCUMENTS

| | | | |
|---|---|---|---|
| 2018/0040955 A1 | 2/2018 | Vouvakis et al. | |
| 2018/0205157 A1 | 7/2018 | Sasaki et al. | |
| 2018/0309198 A1 | 10/2018 | Yu et al. | |
| 2019/0252771 A1* | 8/2019 | Yong | H01Q 21/22 |
| 2020/0021037 A1* | 1/2020 | Wu | H01Q 9/0457 |

FOREIGN PATENT DOCUMENTS

| | | |
|---|---|---|
| CN | 105762508 | 7/2016 |
| CN | 106299664 | 1/2017 |
| CN | 206313137 | 7/2017 |
| CN | 107681262 | 2/2018 |
| CN | 108933327 | 12/2018 |
| CN | 109687135 | 4/2019 |
| CN | 110190392 | 8/2019 |
| CN | 110350315 | 10/2019 |
| CN | 110380218 | 10/2019 |
| CN | 110447146 | 11/2019 |
| CN | 110649382 | 1/2020 |
| CN | 110867662 | 3/2020 |
| CN | 111063988 | 4/2020 |

OTHER PUBLICATIONS

Sun et al., "Design of a broadband gap bane magnetoelectric dipole antenna using microstrip line feed," National Antenna Annual Conference, 2019.
Li et al., "A Ka-Band Wideband Dual-Polarized Magnetoelectric Dipole Antenna Array on LTCC," IEEE Transactions on Antennas and Propagation, Jun. 2020, vol. 68, No. 6.
Yang et al., "Millimeter-Wave Dual-Polarized Filtering Antenna for 5G Application," IEEE Transactions on Antennas and Propagation, Jul. 2020, vol. 68, No. 7.
Sun et al., "Wideband Magneto-Electric Dipole Antennas for Millimeter-Wave Applications with Microstrip Line Feed," 2018 International Symposium on Antennas and Propagation (ISAP), KIEES, Oct. 2018.
Ge et al., "Linearly Polarized and Dual-Polarized Magneto-Electric Dipole Antennas With Reconfigurable Beamwidth in the H-plane," IEEE Transactions on Antennas and Propagation, Feb. 2016, vol. 64, No. 2.
Wu et al., "Dual-Polarized Magneto-Electric Dipole Antenna and MIMO Array for 5G Millimeter-Wave applications," 2019 International Conference on Microwave and Millimeter Wave Technology (ICMMT), IEEE, May 2019.
Yang et al., "Low-Profile Dual-Polarized Filtering Magneto-Electric Dipole Antenna for 5G Applications," IEEE Transactions on Antennas and Propagation, Oct. 2019, vol. 67, No. 10.
Chen et al., "Developing Wideband Dual-Circularly Polarized Antenna With Simple Feeds Using Magnetoelectric Dipoles," IEEE Antennas and Wireless Propagation Letters, Jun. 2020, vol. 19, No. 6.
EPO, Extended European Search Report for EP Application No. 21797924.4, Jul. 26, 2023.
Chen et al., "LTCC Based Dual-Polarized Magneto-Electric Dipole Antenna for 5G Millimeter Wave Application," 13th European Conference on Antennas and Propagation (EuCAP), 2019.
Zhang et al., "Design of a Wideband Dual-Polarized Magneto-Electric Dipole Antenna," Cross Strait Quad-Regional Radio Science and Wireless Technology Conference (CSQRWC), 2019.
WIPO, International Search Report for PCT/CN2021/079664, Jun. 9, 2021.
CNIPA, First Office Action for CN Application No. 202010370756.0, Mar. 1, 2022.
TIPO, Letter of Notification of Examination Comments for TW Application No. 110114913, May 9, 2022.
TIPO, Patent Approval Letter for TW Application No. 110114913, Jul. 19, 2022.

* cited by examiner

ANTENNA MODULE AND ELECTRONIC DEVICE

CROSS REFERENCE OF RELATED APPLICATIONS

This application is a continuation of International Application No. PCT/CN2021/079664, filed Mar. 9, 2021, which claims priority to Chinese Patent Application No. 202010370756.0, filed Apr. 30, 2020, the entire disclosures of which are incorporated herein by reference.

TECHNICAL FIELD

The disclosure relates to the field of electronic technologies, and more particularly to an antenna module and an electronic device.

BACKGROUND

An electronic device is generally disposed an antenna module therein for communication. How to improve a working bandwidth of the antenna module, reduce scanning loss and improve transmission efficiency of the antenna module has become a problem to be solved.

SUMMARY

The present disclosure provides an antenna module and an electronic device.

Specifically, the present disclosure provides an antenna module including:

- a first antenna layer, including at least one main radiation unit and at least one feeder portion, wherein the main radiation unit includes at least two main radiation patches symmetrically and spaced apart from each other, the feeder portion is disposed in or arranged corresponding to a gap between adjacent two of the main radiation patches, the feeder portion is electrically connected or coupled to the main radiation patches;
- a second antenna layer, stacked with the first antenna layer and including a reference ground and at least one microstrip, wherein the reference ground is arranged opposite to the main radiation patches, the microstrip is disposed on a layer where the reference ground is located, disposed between the reference ground and the main radiation patches or disposed on a side of the reference ground facing away from the main radiation patches, the microstrip is insulated from the reference ground, and a first end of the microstrip is configured (i.e., structured and arranged) to be electrically connected to a radio frequency (RF) transceiver chip;
- at least one first electrically conductive member, electrically connected to the main radiation patches and the reference ground; and
- at least one second electrically conductive member, an end of the second electrically conductive member being electrically connected to the feeder portion and another end of the second electrically conductive member being electrically connected to another end of the microstrip.

The present disclosure further provides an electronic device including the antenna module described above.

BRIEF DESCRIPTION OF DRAWINGS

In order to explain technical solutions of embodiments of the present disclosure more clearly, drawings used in the embodiments will be briefly introduced below. Apparently, the drawings introduced below are only some embodiments of the present disclosure. For those skilled in the art, other drawings can be obtained according to these drawings without paying creative labor.

DETAILED DESCRIPTION OF EMBODIMENTS

Technical solutions in illustrated embodiments of the present disclosure will be described clearly and completely below in combination with the accompanying drawings in the illustrated embodiments of the present disclosure. Apparently, the illustrated embodiments are only some of embodiments of the present disclosure, rather than all of embodiments of the disclosure. The embodiments illustrated in the present disclosure can be combined with each other as appropriate.

Figure 1:
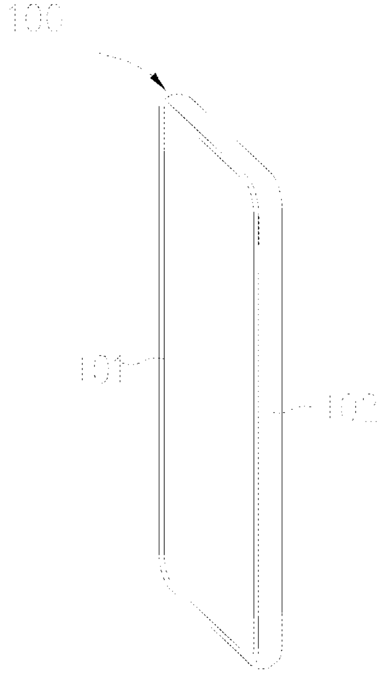
FIG. 1 illustrates a schematic structural view of an electronic device according to a first embodiment of the present disclosure.

FIG. 1 illustrates a schematic structural view of an electronic device according to an embodiment of the present disclosure. The electronic device 100 may be a device capable of transmitting and receiving electromagnetic wave signals, such as a telephone, a television, a tablet computer, a mobile phone, a camera, a personal computer, a notebook computer, a vehicle mounted device, a headset, a watch, a wearable device, a base station, a vehicle mounted radar, or customer premise equipment (CPE). The present disclosure is illustrated by taking the electronic device 100 being the mobile phone as an example.

It should be noted that in the illustrated embodiments of the present disclosure, same reference signs denote same components, and for the sake of brevity, detailed descriptions of the same components are omitted in different embodiments. It can be understood that dimensions such as thicknesses, lengths and widths of various components in the illustrated embodiments of the present disclosure shown in the accompanying drawings are only illustrative and should not constitute any limitation to the present disclosure.

Figure 2:
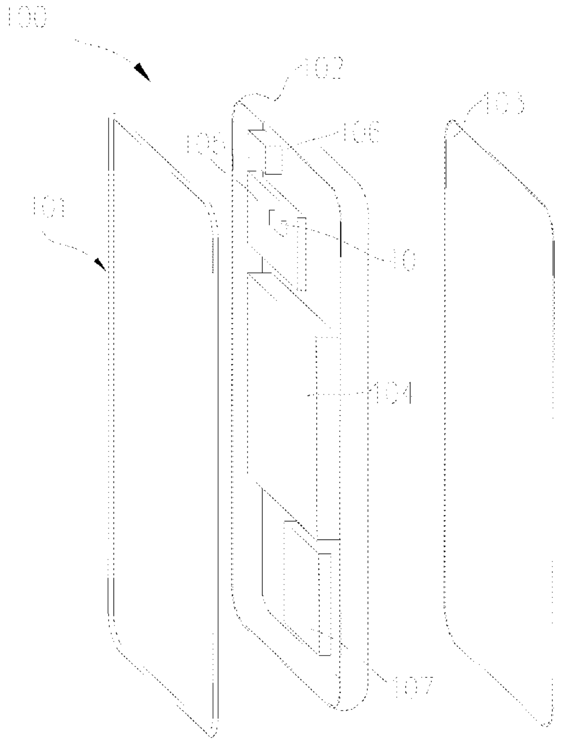
FIG. 2 illustrates a schematic disassembled structural view of the electronic device of FIG. 1.

FIG. 2 illustrates a schematic disassembled structural view of the electronic device 100 according to an embodiment of the present disclosure. The electronic device 100 includes a display screen 101, a middle frame 102, and a battery cover 103, which are fixedly connected to and engaged with one another sequentially in that order. The electronic device 100 further includes devices capable of realizing basic functions of the mobile phone, such as an antenna module 10, a battery 104, a main board (also referred to as mother board) 105, a camera 106, a small board 107, a microphone, a receiver, a speaker, a face recognition module, and a fingerprint recognition module, which are disposed in an internal space surrounded by the display screen 101, the middle frame 102, and the battery cover 103, and detailed description thereof is omitted in the embodiment. The present disclosure does not specifically limit a position of the antenna module 10 in the electronic device 100.

As shown in FIG. 2, at least part of the antenna module 10 is disposed on or electrically connected to the main board 105. In an embodiment, the antenna module 10 through one a board-to-board (BTB) connector is directly electrically connected to another BTB connector on the main board 105. In FIG. 2, the BTB connector on the antenna module 10 and the BTB connector on the main board 105 are blocked and thus the connectors are not shown herein.

Figure 3:
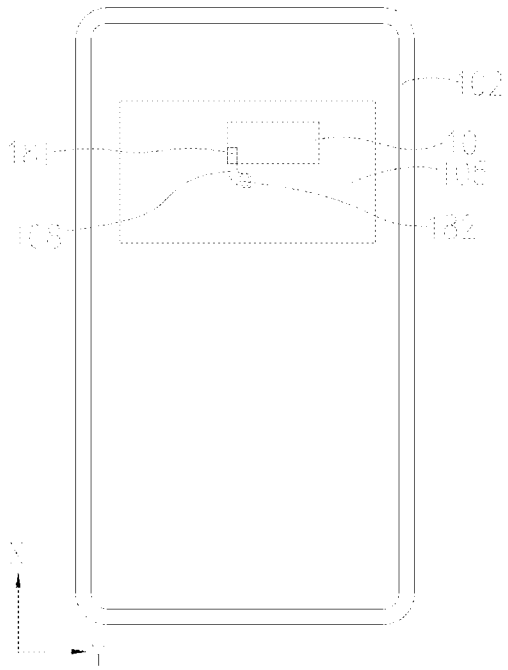
FIG. 3 illustrates another schematic view of an antenna module of FIG. 2 being mounted on a main board.

In an embodiment, as shown in FIG. 3, the antenna module 10 may be electrically connected to the main board 105 through a flexible circuit board 108. Specifically, an end of the flexible circuit board 108 is disposed with a BTB connector 181 electrically connected to the antenna module 10, and the other end of the flexible circuit board 108 is disposed with another BTB connector 182 electrically connected to the main board 105.

Figure 4:
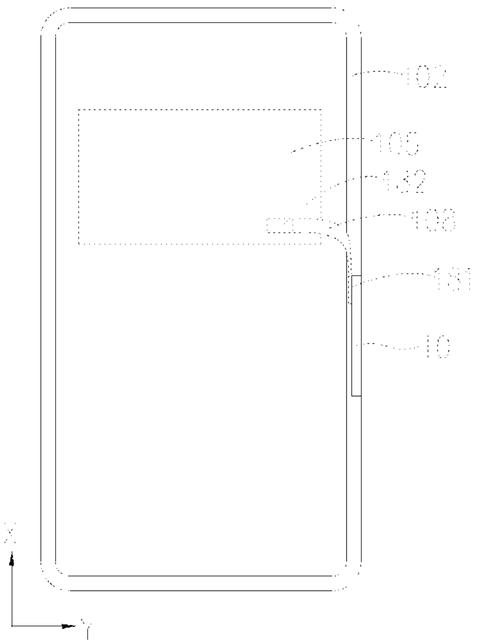
FIG. 4 illustrates still another schematic view of the antenna module of FIG. 2 being mounted on the main board.

In an embodiment, as shown in FIG. 3, the antenna module 10 may be arranged to be parallel to the battery cover 103 (i.e., the antenna module 10 is arranged opposite to the main board 105). In another embodiment, as shown in FIG. 4, the antenna module 10 may be disposed perpendicular to the battery cover 103, and more specifically, the antenna module 10 may be located on a side of the battery 104 or a side of the main board 105. In other embodiments, the antenna module 10 may have a certain inclination angle with respect to the main board 105.

The antenna module 10 is used to transmit and receive electromagnetic wave signals of a preset frequency band. The preset frequency band includes at least one of a frequency band below 1 gigahertz (GHz), a sub-6 GHz frequency band from 1 GHz to 5 GHz, a millimeter wave frequency band, a sub-millimeter wave frequency band, and a terahertz wave frequency band. In the illustrated embodiment, the preset frequency band being the millimeter wave frequency band is taken as an example, which will not be repeated below. A frequency range of the millimeter wave frequency band is from 24.25 GHz to 52.6 GHz. Third generation partnership project (3GPP) Release 15 version specifies the current 5G millimeter wave frequency band as follows: n257 (26.5~29.5 GHz), n258 (24.25~27.5 GHZ), n261 (27.5~28.35 GHz), and n260 (37~40 GHz).

Figure 5:
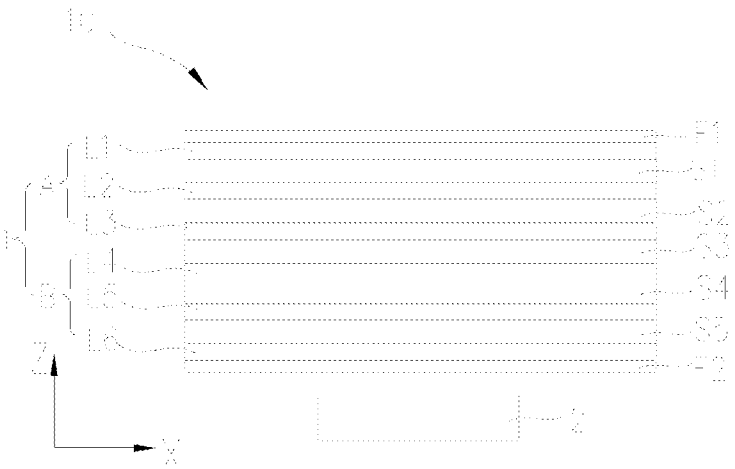
FIG. 5 illustrates a schematic side view of the antenna module of FIG. 2.

As shown in FIG. 5, the antenna module 10 according to a first embodiment of the present disclosure includes at least one antenna unit 1 and a radio frequency (RF) transceiver chip 2. In this embodiment, four antenna units 1 are taken as an example for description. The four antenna units 1 are arranged in a manner of one column and four rows (1*4). Of course, in other embodiments, the number of antenna units 1 may be eight and arranged in a manner of two columns and four rows (2*4); alternatively, the number of antenna units 1 may be sixteen and arranged in a manner of four columns and four rows (4*4). It can be understood that the four antenna units 1 are interconnected as a whole. In other words, the four antenna units 1 may be disposed on a same carrier substrate to form a hard circuit board or a flexible circuit board.

For convenience of description, the antenna module 10 is defined with reference to a first viewing angle, a width direction of the antenna module 10 is defined as an X-axis direction, a length direction of the antenna module 10 is defined as a Y-axis direction, and a thickness direction of the antenna module 10 is defined as a Z-axis direction. A width dimension of the antenna module 10 is smaller than a length dimension of the antenna module 10. A direction indicated by an arrow is the positive direction. In this embodiment, four antenna units 1 are arranged along the Y-axis direction.

The structure of the antenna unit 1 will be described with reference to the accompanying drawings.

As shown in FIG. 5, the antenna unit 1 includes a first protective layer F1, a first conductive layer L1, a first plate layer S1, a second conductive layer L2, a second plate layer S2, a third conductive layer L3, a third plate layer S3, a fourth conductive layer L4, a fourth plate layer S4, a fifth conductive layer L5, a fifth plate layer S5, a sixth conductive layer L6, and a second protective layer F2, stacked sequentially in that order. Of course, in other embodiments, the number of conductive layers may be five, seven, or the like.

In this embodiment, as shown in FIG. 5, the first protective layer F1, the first conductive layer L1, the first plate layer S1, the second conductive layer L2, the second plate layer S2, the third conductive layer L3 and the third plate layer S3 are defined as a first antenna layer A. The fourth conductive layer L4, the fourth plate layer S4, the fifth conductive layer L5, the fifth plate layer S5, the sixth conductive layer L6 and the second protective layer F2 are defined as a second antenna layer B. The first antenna layer A and the second antenna layer B are stacked.

Specifically, the first conductive layer L1, the second conductive layer L2, the third conductive layer L3, the fourth conductive layer L4, the fifth conductive layer L5, and the sixth conductive layer L6 each may be made of a metal with good electrical conductivity. Materials of the six conductive layers may all be copper or aluminum. In this embodiment, the materials of the six conductive layers all being copper is taken as an example. In other words, the six conductive layers are all copper foil layers, and shapes of the respective copper foil layers may be the same or different. Materials of the first plate layer S1, the second plate layer S2, the third plate layer S3, the fourth plate layer S4 and the fifth plate layer S5 each are an insulation material, and these plate layers serve as carrier plates of the respective conductive layers and are further used to electrically insulate every adjacent two of the conductive layers from each other. In this embodiment, the first conductive layer L1 through the sixth conductive layer L6 will be mainly described in detail.

Figure 6:
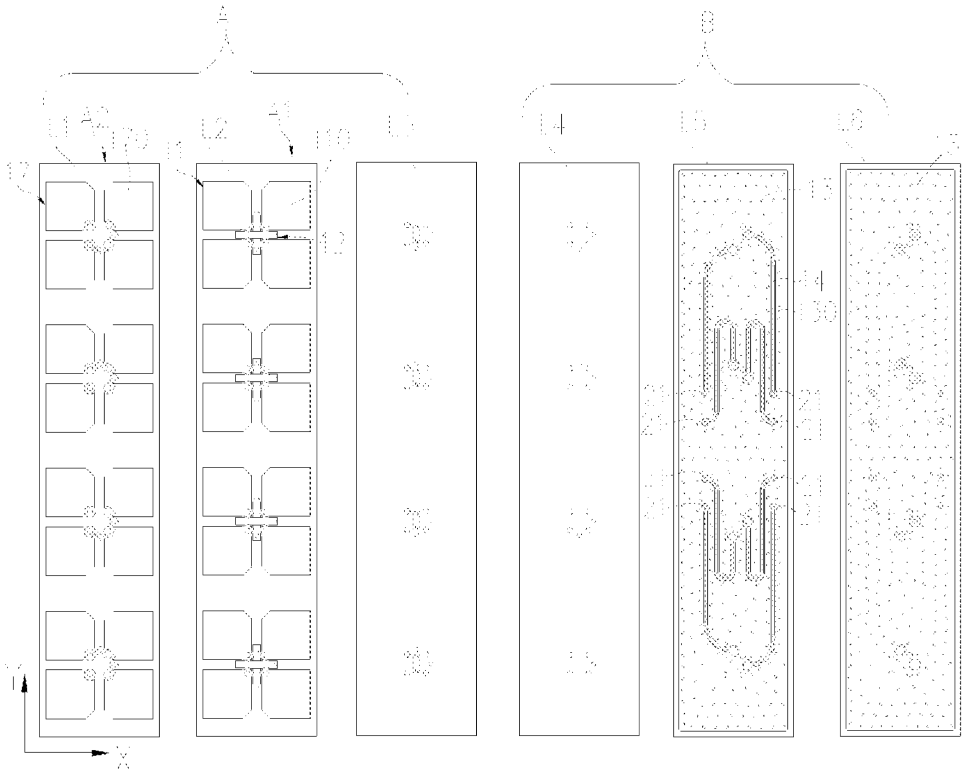
FIG. 6 illustrates schematic structural views of a first conductive layer, a second conductive layer, a third conductive layer, a fourth conductive layer, a fifth conductive layer, and a sixth conductive layer of FIG. 5 being laid on a same plane.

As shown in FIG. 6, the first antenna layer A includes at least one main radiation unit 11 and at least one feeder portion 12. The first antenna layer A includes a main radiation layer A1, the at least one main radiation unit 11 is disposed on the main radiation layer A1, and the at least one feeder portion 12 may be partially disposed on the main radiation layer A1 or completely disposed outside the main radiation layer A1.

As shown in FIG. 6, the at least one main radiation unit 11 is disposed on the second conductive layer L2 (the first conductive layer L1 will be described later). Each the main radiation unit 11 includes at least two main radiation patches 110 arranged symmetrically and spaced apart from each other. The main radiation patches 110 serve as a receiving end (or a transmitting end) of the antenna module 10 that receives (or transmits) electromagnetic wave signals. A material of the main radiation patch 110 is electrically conductive material. Specifically, the material of the main radiation patch 110 includes but is not limited to a metal, an electrically conductive plastic, an electrically conductive polymer, an electrically conductive oxide, etc. The main radiation patches are printed on a plate in a form of flat patch, and thus processing thereof is simple and cost is low.

In this embodiment, a shape of the main radiation patch 110 is not specifically limited. For example, the shape of the main radiation patch 110 may be rectangular, fan-shaped, triangular, circular, ring-shaped, cross-shaped, etc. In this embodiment, the shape of the main radiation patch 110 being substantially rectangular is taken as an example for description.

The number of the main radiation patches 110 in one main radiation unit 11 is not specifically limited in the present disclosure. For example, the number of main radiation patches 110 in one main radiation unit 11 may be two, three, four, six, eight, and so on. In this embodiment of the present disclosure, the number of the main radiation patches 110 being four is taken as an example for description, and the four main radiation patches 110 are centrosymmetrically arranged. In other words, each of the four main radiation patches 110 occupies a space of one quadrant, and the four main radiation patches 110 respectively occupy four quadrants on a plane.

It should be understood that shapes of the respective four main radiation patches 110 may be the same or different, and this disclosure does not specifically limit this. In this embodiment, the shapes of the four main radiation patches 110 being all the same is taken as an example for description.

Figure 7:
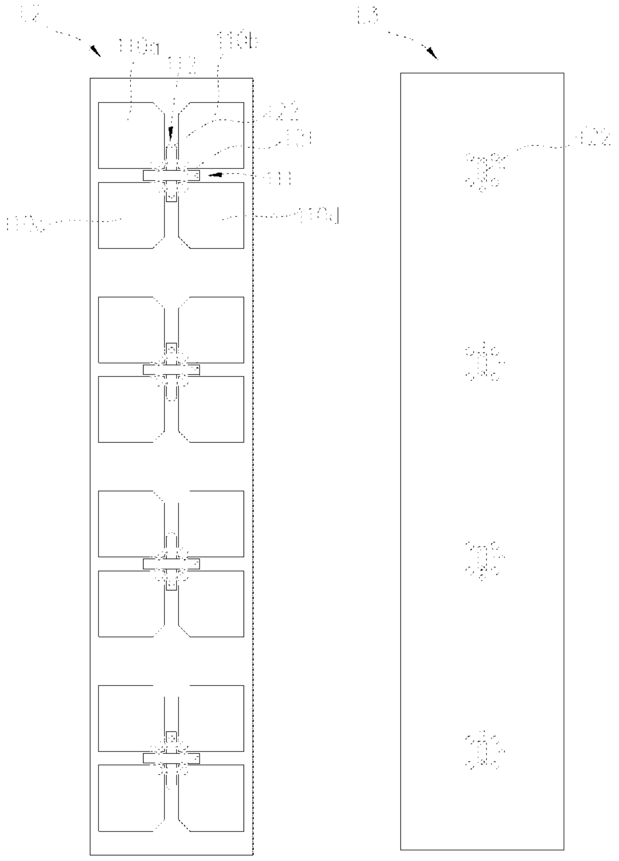
FIG. 7 illustrates schematic structural views of the second conductive layer and the third conductive layer of FIG. 6 being laid on a same plane.

As shown in FIG. 7, a first gap 111 and a second gap 112 are formed between the four main radiation patches 110 and intersected with each other in a substantially cross-shaped manner. Specifically, the four main radiation patches 110 are respectively defined as a first main radiation patch 110*a*, a second main radiation patch 110*b*, a third main radiation patch 110*c*, and a fourth main radiation patch 110*d*. The first gap 111 extends in the X-axis direction, and the second gap 112 extends in the Y-axis direction.

As shown in FIG. 7, each the feeder portion 12 is located in or corresponds to a gap (including the first gap 111 and the second gap 112) between adjacent two main radiation patches 110. The feeder portion 12 is electrically or coupled to the main radiation patches 110 to thereby transmit an excitation signal to the main radiation patches 110. This embodiment of the present disclosure takes the feeder portion 12 being coupled to the main radiation patch 110 as an example for description, and the feeder portion 12 is spaced apart from the main radiation patches 110.

The multiple main radiation patches 110 and the feeder portion 12 form an electric dipole.

In this embodiment, as shown in FIG. 7, the feeder portion 12 includes a first feeder part 121 and a second feeder part 122. Orthographic projections of the first feeder part 121 and the second feeder part 122 on the second conductive layer L2 are intersected with each other. The first feeder part 121 and the second feeder part 122 are insulated from each other. The first feeder part 121 is located in or arranged corresponding to the first gap 111. The first feeder part 121 may feed the first main radiation patch 110*a* and the second main radiation patch 110*b* on a side of the first feeder part 121, and also feed the third main radiation patch 110*c* and the fourth main radiation patch 110*d* on the other side of the first feeder part 121. The second feeder part 122 is located in or arranged corresponding to the second gap 112. The second feeder part 122 may feed the first main radiation patch 110*a* and the third main radiation patch 110*c* on a side of the second feeder part 122, and also feed the fourth main radiation patch 110*d* and the second main radiation patch 110*b* on the other side of the second feeder part 122. It can be understood that the first feeder part 121 and the second feeder part 122 each are made of an electrically conductive material, including but not limited to a metal, an electrically conductive plastic, an electrically conductive polymer, an electrically conductive oxide, etc.

By arranging the first feeder part 121 and the second feeder part 122 to be orthogonal to each other, the first feeder part 121 feeds the two pairs of main radiation patches 110 on two sides thereof, and the second feeder part 122 feeds the two pairs of main radiation patches 110 on two sides thereof, so as to realize two polarization modes, which can effectively improve communication capacity, transmit and receive simultaneously, and resist multipath attenuation. In this embodiment, the first feeder part 121 is located in the first gap 111, a part of the second feeder part 122 is located in the first gap 111, and a part of an orthogonal projection of the second feeder part 122 on the second conductive layer L2 overlapped with an orthogonal projection of the first feeder part 121 is located in the second gap 112.

As shown in FIG. 6, the second antenna layer B includes a reference ground 13 and at least one microstrip 14.

As shown in FIG. 6, the reference ground 13 may be disposed on any one or more of the fourth conductive layer L4, the fifth conductive layer L5 and the sixth conductive layer L6. In this embodiment, the reference ground 13 is disposed on the fifth conductive layer L5 and the sixth conductive layer L6. Specifically, the fifth conductive layer L5 and the sixth conductive layer L6 each have a large area of copper foil. The fifth conductive layer L5 and the sixth conductive layer L6 are electrically connected through multiple vias, so that potentials of the fifth conductive layer L5 and the sixth conductive layer L6 are equal. The vias include through holes penetrating through the fifth conductive layer L5 and the fifth plate layer S5, and electrically conductive coatings disposed on inner walls of the through holes. A material of the electrically conductive coating may be the same as that of the fifth conductive layer L5. The electrically conductive coatings are electrically connected to the fifth conductive layer L5 and the sixth conductive layer L6.

The reference ground 13 is arranged opposite to the main radiation patches 110. The reference ground 13 may cover multiple main radiation units 11. In other words, the multiple main radiation units 11 share one reference ground 13.

Figure 8:
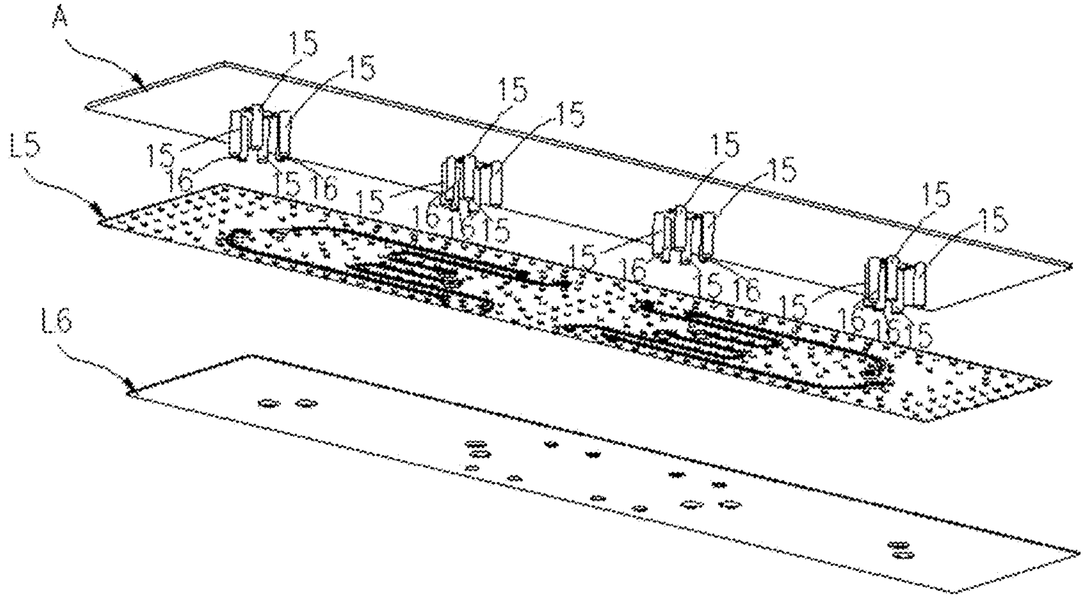
FIG. 8 illustrates schematic disassembled structural views of a first antenna layer, the fifth conductive layer, and the sixth conductive layer of FIG. 6.

As shown in FIG. 6 and FIG. 8, the antenna unit 1 further includes at least one first electrically conductive member 15. The at least one first electrically conductive member 15 is electrically connected to the main radiation patches 110 and the reference ground 13. Specifically, in this embodiment, each the first electrically conductive member 15 is a via. An extension direction of each the first electrically conductive member 15 is the Z-axis direction. The number of the at least one first electrically conductive member 15 is the same as the number of the main radiation patches 110. In this embodiment, the number of the at least one first electrically conductive member 15 is four. Each of the four first electrically conductive members 15 is electrically connected to a corresponding one of the main radiation patches 110. A connection point between the first electrically conductive member 15 and the corresponding main radiation patch 110 is a position of the main radiation patch 110 close to a geometric center of the main radiation unit 11.

As described above, the multiple main radiation patches 110, the multiple first electrically conductive members 15, the feeder portion 12 and the reference ground 13 constitute a magnetic dipole for radiating electromagnetic wave signals.

The disclosure does not specifically limit a position of the at least one microstrip 14. For example, the at least one microstrip 14 may be disposed on the layer where the reference ground 13 is located, and disposed between the reference ground 13 and the main radiation patches 110 or disposed on a side of the reference ground 13 facing away from the main radiation patches 110. In other words, the at least one microstrip 14 may be disposed on any one of the fourth conductive layer L4, the fifth conductive layer L5 and the sixth conductive layer L6. In this embodiment, the at least one microstrip 14 is disposed on the fifth conductive layer L5.

Figure 9:
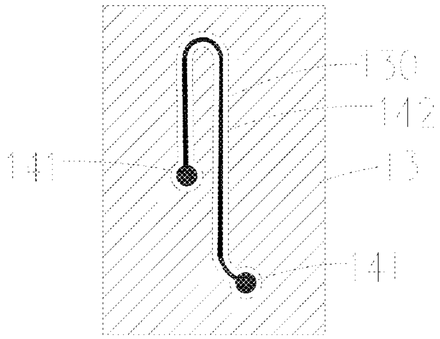
FIG. 9 illustrates a schematic structural view of a first type of microstrip of FIG. 6.

It can be understood that, as shown in FIG. 6 and FIG. 9, a material of each the microstrip 14 is an electrically conductive material, such as copper. The microstrip 14 is insulated from the reference ground 13. Specifically, a large area of copper foil is disposed on the fifth conductive layer L5 as the reference ground 13. The fifth conductive layer L5 is further defined with a hollow portion 130 enclosed by the reference ground 13. The hollow portion 130 is a vacant area. The microstrip 14 is disposed in the hollow portion 130. By adjusting a distance between the microstrip 14 and the reference ground 13 and a length of the microstrip 14, an impedance formed between the microstrip 14 and the reference ground 13 can be adjusted, and thereby an impedance matching of the antenna unit 1 at a working frequency point can be adjusted. In other words, the microstrip 14 forms a matching network of the antenna module 10.

The present disclosure does not specifically limit a structure of the microstrip 14.

For example, as shown in FIG. 9, the microstrip 14 includes two opposite end sections 141 and a middle section 142 connected between the two end sections 141.

In an implementation, as shown in FIG. 9, a line width of the middle section 142 in an extension direction thereof is kept unchanged. In other words, the line width of the middle section 142 is uniform. In a case that a part of the middle section 142 extends along the Y-axis direction, a width dimension of the part of the middle section 142 along the X-axis direction is the line width of the part of the middle section 142. In a case that a part of the middle section 142 extends along the X-axis direction, a width dimension of the part of the middle section 142 along the Y-axis direction is a line width of the part of the middle section 142. The line width of the middle section 142 is smaller than a width of each of the two end sections 141. In this implementation, since the line width of the middle section 142 is uniform, it is convenient to control the impedance of the microstrip 14 by controlling a length of the middle section 142.

Figure 10:
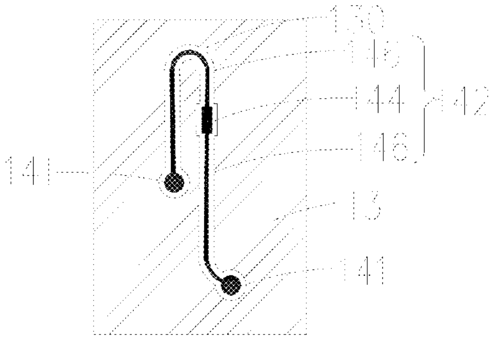
FIG. 10 illustrates a schematic structural view of a second type of microstrip of FIG. 6.

In another implementation, as shown in FIG. 10, the line width of the middle section 142 in its extension direction may not be uniform. Specifically, the middle section 142 includes at least one body portion 146 and at least one widened portion 144 interconnected in the extension direction. A line width of each the widened portion 144 is larger than a line width of the body portion 146. In this implementation, the impedance of the entire microstrip 14 can be adjusted by adjusting a length of the widened portion 144 and a length of the body portion 146. In addition, by providing the widened portion 144, the length of the microstrip 14 can be reduced while the impedance of the microstrip 14 is constant, compared with the microstrip 14 having a uniform line width.

Figure 11:
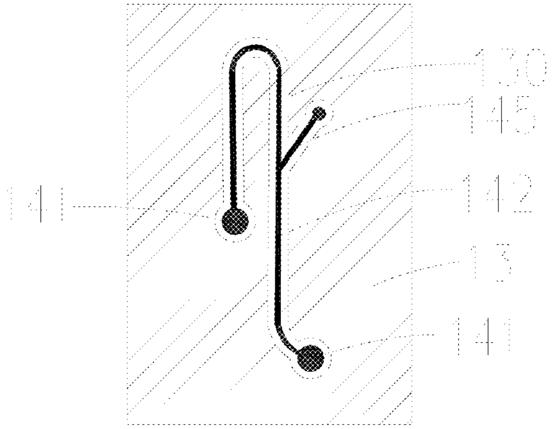
FIG. 11 illustrates a schematic structural view of a third type of microstrip of FIG. 6.

In still another implementation, as shown in FIG. 11, the microstrip 14 further includes at least one branch 145. An end of each branch 145 is electrically connected to the middle section 142. The other end of each branch 145 is open-circuited. The branch 145 extends in a direction inclined or perpendicular with respect to the middle section 142. By providing the branch 145, the impedance of the microstrip 14 can be adjusted without increasing the overall length of the microstrip 14, thereby adjusting the impedance matching of the antenna unit 1 at the working frequency point.

Several different types of microstrips 14 that can be used in the present disclosure are described above, and by adjusting the structure of the microstrip 14, a spacing between the microstrip 14 and the reference ground 13, and the length of the microstrip 14, the impedance formed between the microstrip 14 and the reference ground 13 can be adjusted, and the impedance matching of the antenna unit 1 at the working frequency point can be adjusted consequently.

Figure 12:
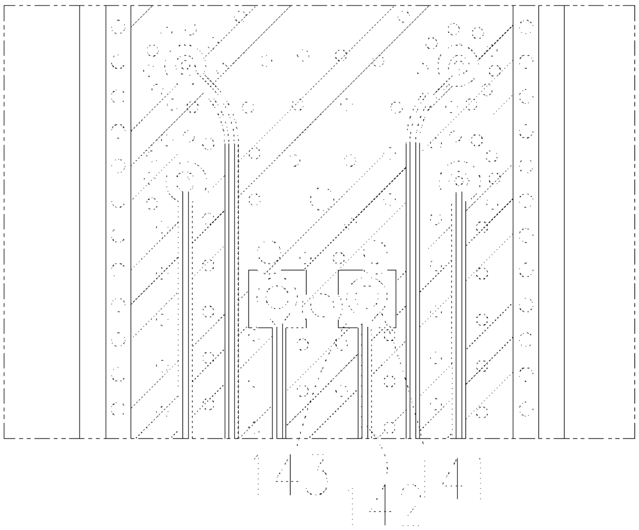
FIG. 12 illustrates a schematic partially enlarged view of the fifth conductive layer according to the first embodiment of the present disclosure.

As shown in FIG. 12, a spacing between the end section 141 and the reference ground 13 is greater than a spacing between the middle section 142 and the reference ground 13. A peripheral line of a clearance area 143 around the end section 141 may be a larger circle or square. In this way, the clearance around the end section 141 is adjusted, to thereby adjust the spacing between the microstrip 14 and the reference ground 13, and adjust the impedance matching of the antenna unit 1 at the working frequency point consequently.

The RF transceiver chip 2 is disposed on a side of the reference ground 13 facing away from the main radiation patches 110. An end of each the microstrip 14 is electrically connected to the RF transceiver chip 2.

As shown in FIG. 6 and FIG. 8, the antenna unit 1 further includes at least one second electrically conductive member 16. Each the second electrically conductive member 16 may be a via. An end of the second electrically conductive member 16 is electrically connected to the feeder portion 12, and the other end of the second electrically conductive member 16 is electrically connected to the other end of the microstrip 14. The second electrically conductive member 16 is connected to one end of the feeder portion 12 facing away from the geometric center of the main radiation unit 11. The second electrically conductive member 16 extends along the Z-axis direction, to reduce the loss of an excitation signal during transmission and improve antenna efficiency of the antenna module 10. In this embodiment, each the second electrically conductive member 16 is a via.

In this embodiment, one antenna unit 1 includes two second electrically conductive members 16 and two microstrips 14. One second electrically conductive member 16 is electrically connected to one end of the first feeder part 121 and one end of one of the microstrips 14, and the other end of the microstrip 14 is electrically connected to one pin of the RF transceiver chip 2. The other second electrically conductive member 16 is electrically connected to one end of the second feeder part 122 and one end of the other one of the microstrips 14, and the other end of the microstrip 14 is electrically connected to another pin of the RF transceiver chip 2.

In this embodiment, the RF transceiver chip 2 is disposed at or close to a geometric center of the antenna module 10 on a X-Y plane.

As shown in FIG. 6, when the number of the main radiation units 11 is four, the fifth conductive layer L5 is disposed with four sets of pins 21 of the RF transceiver chip 2 close to a center of the fifth conductive layer. Each set of pins 21 includes two pins 21. Each set of pins 21 are electrically connected to two microstrips 14 of one main radiation unit 11 respectively. In other words, the microstrips 14 corresponding to each main radiation unit 11 extends in a direction facing towards the RF transceiver chip 2. The microstrip 14 may extend in a curved line.

In this embodiment, the RF transceiver chip 2 is disposed corresponding to a geometric center of the fifth conductive layer L5. The multiple microstrips 14 on the fifth conductive layer L5 may be symmetrically disposed about a center line passing through the geometric center of the fifth conductive layer L5 and extending in the X direction. Of course, the RF transceiver chip 2 may also be disposed at other positions.

The present disclosure does not specifically limit the length of the microstrip 14. By adjusting the length of the microstrip 14, the impedance of the antenna unit 1 can be adjusted, and then the impedance matching of the antenna unit 1 at the working frequency point can be adjusted.

According to the antenna module 10 provided in this embodiment, by designing the structure of the antenna module 10, the main radiation patches 110 and the feeder portion 12 form an electric dipole, and the main radiation patches 110, the first electrically conductive member 15, the feeder portion 12 and the reference ground 13 form a magnetic dipole, so that the antenna module 10 is a combination of an electric dipole and a magnetic dipole, which can achieve a broad frequency band, obtain a stable gain and a directional view throughout the working frequency band, taking into account its characteristics such as bandwidth, isolation, cross-polarization, and gain. By providing the microstrips 14 between the feeder portion 12 and the RF transceiver chip 2, the impedance can be adjusted by setting the length of the microstrip 14 and the spacing between the microstrip 14 and the reference ground 13, and the impedance matching of the antenna unit 1 at the working frequency point can be adjusted consequently, a broadband and miniaturized antenna module 10 can be realized.

Figure 13:
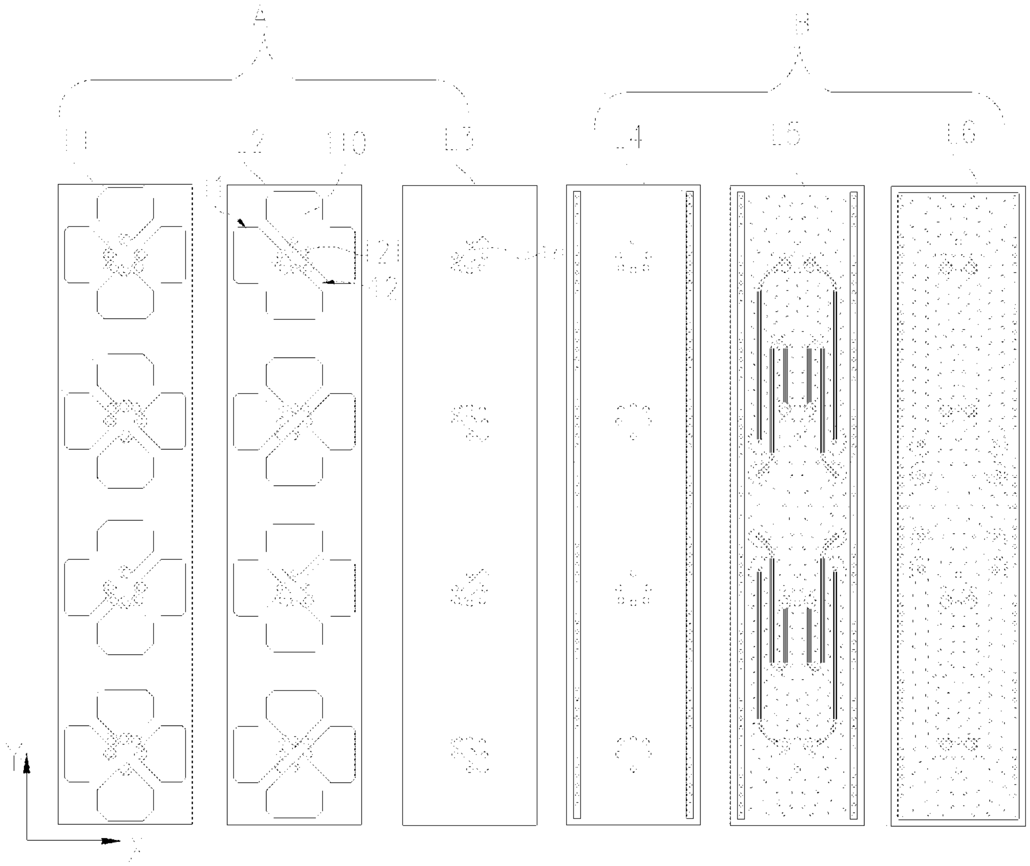
FIG. 13 illustrates schematic structural views of a first conductive layer, a second conductive layer, a third conductive layer, a fourth conductive layer, a fifth conductive layer, and a sixth conductive layer in an antenna module which are laid on a same plane according to a second embodiment of the present disclosure.

As shown in FIG. 13, an antenna module 10 according to a second embodiment of the present disclosure, which has substantially the same structure as that of the antenna module 10 according to the first embodiment, and the main difference is that in this embodiment, the multiple main radiation units 11 are arranged along a third direction (a first direction and a second direction are described in detail below), the third direction is the Y-axis direction. An included angle between the extension direction of the first gap 111 and the third direction is in a range of from 0 degree to 45 degrees, and an included angle between the extension direction of the second gap 112 and the third direction is in a range of from 0 degree to 45 degree.

In other words, compared with the first embodiment, each of the main radiation units 11 according to this embodiment is rotated by a degree in a range of from 0 degree to 45 degrees around a geometric center thereof. In this embodiment, a rotation angle is 45 degrees.

By rotating the main radiation units 11, a distance between feeders of different polarizations of the first feeder part 121 and an edge of the reference ground 13 is relatively balanced, so that the difference in scanning loss in results of different polarizations is reduced.

After rotating the main radiation units 11, shapes of respective main radiation patches 110 are adaptively changed, and the shapes of respective main radiation patches 110 are similar to be fan-shaped.

In other embodiments, the shapes of respective main radiation patches 110 may be triangular to thereby make an outer contour of the whole main radiation patches 110 is close to a square.

In combination with any embodiment of the present disclosure, optionally, as shown in FIG. 14 to FIG. 17, an edge of at least one of the main radiation patches 110 of one main radiation unit 11 is defined with at least one first groove 113. The first groove 113 may be a rectangular groove, a circular groove, a triangular groove, or a T-shaped groove. In this embodiment, each main radiation patch 110 is disposed with at least one first groove 113. It should be noted that FIG. 14 to FIG. 17 illustrating the main radiation unit 11 in the first embodiment are taken as an example for description. Of course, the first groove 113 according to the present disclosure is also applicable to the main radiation unit 11 according to the second embodiment.

By providing the first groove 113 on the main radiation patch 110 to change an upper current path on a surface of the main radiation patch 110, the impedance matching of the antenna unit 1 can be effectively improved. By reasonably adjusting parameters of the first groove 113, the impedance of the antenna unit 1 can be changed to thereby match the impedance of the antenna unit 1 at the required frequency point.

Figure 14:
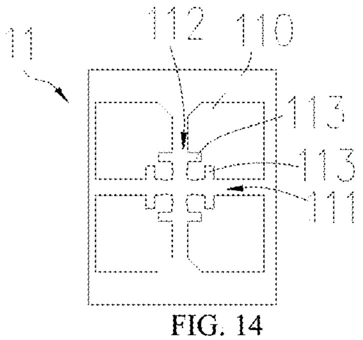
FIG. 14 illustrates a schematic view of a first kind of structure of main radiation patches according to the first embodiment of the present disclosure.

As shown in FIG. 14, the first groove 113 is communicated with the gap between adjacent two of the main radiation patches 110. Specifically, two adjacent sides of each of the main radiation patches 110 are defined with first grooves 113. Of course, each of the main radiation patches 110 may also be defined with one, three, or other number of grooves. The two adjacent sides of the each of the main radiation patches are defined with first grooves 113 to be communicated with the first gap 111 and the second gap 112 respectively. Specifically, a shape of the first groove 113 is rectangular. In other embodiments, the first groove 113 may be a rectangular groove, a circular groove, a triangular groove, or a T-shaped groove.

Figure 15:
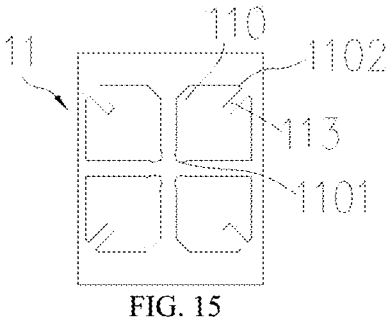
FIG. 15 illustrates a schematic view of a second kind of structure of main radiation patches according to the first embodiment of the present disclosure.

As shown in FIG. 15, the main radiation patch 110 includes a first end 1101 and a second end 1102 opposite to each other. The first end 1101 is close to a geometric center of the main radiation unit 11. The first groove 113 is defined at the second end 1102 and extends towards the first end 1101. A shape of the first groove 113 is rectangular. In other embodiments, the first groove 113 may be a rectangular groove, a circular groove, or a triangular groove.

Figure 16:
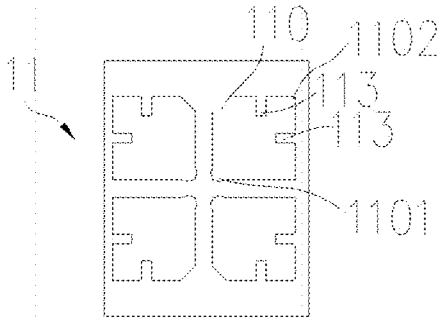
FIG. 16 illustrates a schematic view of a third kind of structure of main radiation patches according to the first embodiment of the present disclosure.

As shown in FIG. 16, each of the main radiation patches 110 is defined with two first grooves 113. The two first grooves 113 are respectively defined on adjacent two sides of the second end 1102 on each of the main radiation patches 110 and extend in the X-axis direction and the Y-axis direction respectively. Opening directions of the two first grooves 113 both face outside the main radiation unit 11. Of course, in other embodiments, each of the main radiation patches 110 may also be defined with one, three, or other number of grooves 113. A direction of the first groove 113 is not specifically limited. Specifically, the shape of the first groove 113 is rectangular. In other embodiments, the first groove 113 may be a rectangular groove, a circular groove, a triangular groove, or a T-shaped groove.

Figure 17:
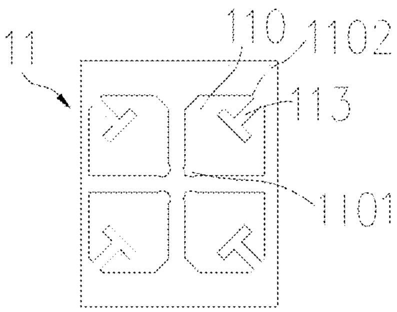
FIG. 17 illustrates a schematic view of a fourth kind of structure of main radiation patches according to the first embodiment of the present disclosure.

As shown in FIG. 17, this embodiment is similar to the embodiment shown in FIG. 15 except that each of the first grooves 113 according to this embodiment is a T-shaped groove.

Figure 18:
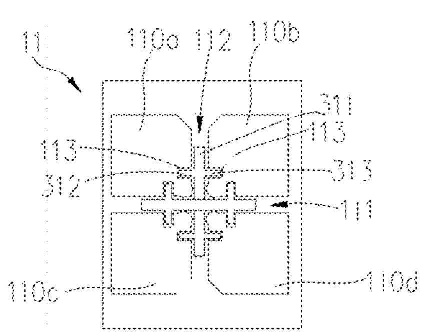
FIG. 18 illustrates a schematic view of a fifth kind of structure of main radiation patches according to the first embodiment of the present disclosure.

In an embodiment, as shown in FIG. 18, the first groove 113 is communicated with the first gap 111 or the second gap 112 between the adjacent two of the main radiation patches 110. A part of the feeder portion 12 extends into the first groove 113. For example, the first main radiation patch 110*a* and the second main radiation patch 110*b* each are defined with first grooves 113. The second feeder part 122 includes a main body section 311, and a first second extension section 312 and a second extension section 313 respectively disposed on opposite sides of the main body section 311. The main body section 311 is disposed in a gap between the first main radiation patch 110*a* and the second main radiation patch 110*b*. The first extension section 312 and the second extension section 313 are respectively disposed in the first groove 113 of the first main radiation patch 110*a* and the first groove 113 of the second main radiation patch 110*b*.

By extending the first extension section 312 and the second extension section 313 of the second feeder part 122 into the first grooves 113 respectively, on the one hand, the impedance of the feeder portion 12 can be adjusted to thereby improve the impedance matching of the antenna unit 1; on the other hand, the compactness between the feeder portion 12 and the main radiation patches 110 can be improved and the miniaturization of the antenna unit 1 can be promoted.

Figure 19:
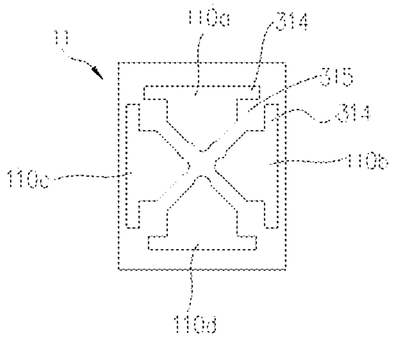
FIG. 19 illustrates a schematic view of a sixth kind of structure of main radiation patches according to the first embodiment of the present disclosure.

In an embodiment, as shown in FIG. 19, the main radiation unit 11 further includes a first main radiation patch 110*a* and a second main radiation patch 110*b* disposed adjacent to each other. A side of the first main radiation patch 110*a* adjacent to the second main radiation patch 110*b* is disposed with at least one first protrusion 314. The first protrusion 314 extends towards the second main radiation patch 110*b*. In this embodiment, the main radiation unit 11 according to the second embodiment is taken as an example for description. The first main radiation patch 110*a* and the second main radiation patch 110*b* are fan-shaped. There is a vacant area 315 between the first main radiation patch 110*a* and the second main radiation patch 110*b*. The opposite sides of each main radiation patch 110 may be respectively disposed with first protrusions 314. The first protrusion 314 extends towards the vacant area 315.

As shown in FIG. 6, the antenna module 10 further includes one or more parasitic radiation layers A2.

In an embodiment, the parasitic radiation layer A2 is disposed between the main radiation layer A1 and the second antenna layer B. Specifically, as shown in FIG. 5, when the main radiation layer A1 is the second conductive layer L2, the parasitic radiation layer A2 may be the third conductive layer L3.

In an embodiment, the parasitic radiation layer A2 is disposed on a side of the main radiation layer A1 facing away from the second antenna layer B. Specifically, as shown in FIG. 5 and FIG. 6, when the main radiation layer A1 is the second conductive layer L2, the parasitic radiation layer A2 may be the first conductive layer L1.

In an embodiment, the parasitic radiation layer A2 may be at least two layers. The at least two parasitic radiation layers A2 are respectively located on opposite sides of the main radiation layer A1. That is, the at least two parasitic radiation layers A2 are respectively disposed between the main radiation layer A1 and the second antenna layer B and disposed on a side of the main radiation layer A1 facing away from the second antenna layer B. Specifically, as shown in FIG. 5, when the main radiation layer A1 is the second conductive layer L2, the two parasitic radiation layers A2 may be the first conductive layer L1 and the third conductive layer L3.

As shown in FIG. 6, the parasitic radiation layer A2 includes at least one parasitic radiation unit 17. The parasitic radiation unit 17 includes at least two parasitic radiation patches 170 symmetrically and spaced apart from each other. Each of the parasitic radiation patches 170 is disposed opposite to a corresponding one of the main radiation patches 110.

In an embodiment, the number of parasitic radiation units 17 may be the same as the number of main radiation units 11. Each of the parasitic radiation units 17 faces one of the main radiation units 11. The parasitic radiation patches 170 are not electrically connected to the first electrically conductive members 15. The number of parasitic radiation patches 170 in one parasitic radiation unit 17 is the same as the number of main radiation patches 110 in one main radiation unit 11.

In this embodiment, there are four parasitic radiation units 17, and each of the parasitic radiation units 17 is disposed with four parasitic radiation patches 170. A shape of the parasitic radiation patch 170 may be triangular, rectangular, square, rhombus, circular, ring-shaped, or an approximate pattern of the above shapes. The shapes of the multiple parasitic radiation patches 170 in one parasitic radiation unit 17 may be the same or different. The shape of each of the parasitic radiation patches 170 is the same as or different from the shape of its corresponding main radiation patch 110. In this embodiment, the parasitic radiation patches 170 having the same shapes as the main radiation patches 110 are taken as an example for description.

By providing the parasitic radiation patches 170, the parasitic radiation patches 170 are respectively coupled with the main radiation patches 110 to change the current intensity on the surfaces of the main radiation patches 110, thereby improving the impedance matching of the antenna unit 1, and increase the gain and widen the impedance bandwidth of the antenna unit 1 consequently. The impedance bandwidth of the antenna unit 1 can be adjusted by properly adjusting sizes of the parasitic radiation patches 170.

In an embodiment, the feeder portion 12 may not only be disposed in the gap between the main radiation patches 110, but may also be at least partially disposed in the gap between adjacent two of the parasitic radiation patches 170. In this embodiment, the gap formed between the parasitic radiation patches 170 is substantially the same as the gap formed between the main radiation patches 110.

Figure 20:
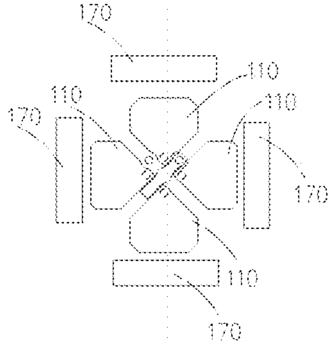
FIG. 20 illustrates a schematic structural view of a main radiation layer according to the first embodiment of the present disclosure.

In an embodiment, as shown in FIG. 20, the parasitic radiation layer A2 and the main radiation layer A1 may be on a same layer, and the multiple parasitic radiation patches 170 of one parasitic radiation unit 17 are arranged around a periphery of a main radiation unit 11. For example, one main radiation unit 11 includes four main radiation patches 110, one parasitic radiation unit 17 includes four parasitic radiation patches 170, the four parasitic radiation patches 170 are sequentially circumscribed on a peripheral side of one main radiation unit 11, and each of the parasitic radiation patches 170 is opposite to one of the main radiation patches 110.

The further improvement of the parasitic radiation unit 17 will be described below in combination with the accompanying drawings, the parasitic radiation unit 17 in FIG. 13 is taken as an example for description.

Specifically, as shown in FIG. 21 to FIG. 24, an edge of at least one of the parasitic radiation patches 170 of the parasitic radiation unit 17 is defined with at least one second groove 171 or at least one second protrusion 172.

Figure 21:
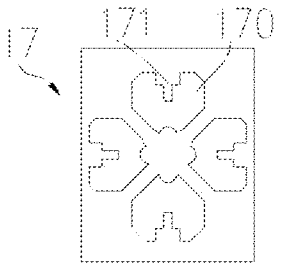
FIG. 21 illustrates a schematic view of a first kind of structure of parasitic radiation patches according to the second embodiment of the present disclosure.
Figure 22:
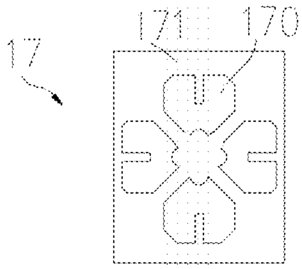
FIG. 22 illustrates a schematic view of a second kind of structure of parasitic radiation patches according to the second embodiment of the present disclosure.

As shown in FIG. 21 to FIG. 22, an opening of the at least one second groove 171 faces outside the parasitic radiation unit 17. This embodiment is similar to the embodiment in which the edges of the main radiation patches 110 in the main radiation unit 11 is defined with the at least one first groove 113, with reference to the embodiments in FIG. 15 through FIG. 17 for details.

Figure 23:
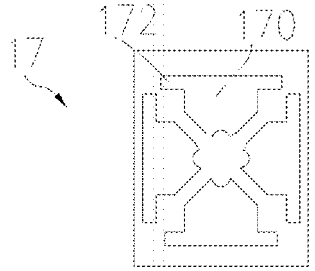
FIG. 23 illustrates a schematic view of a third kind of structure of parasitic radiation patches according to the second embodiment of the present disclosure.

As shown in FIG. 23, the edge of the parasitic radiation patch 170 is disposed with the second protrusion 172. This embodiment is similar to the embodiment in which the edge of the main radiation patch 110 in the main radiation unit 11 is disposed with the first protrusion 314, with reference to the embodiment in FIG. 19 for details.

Figure 24:
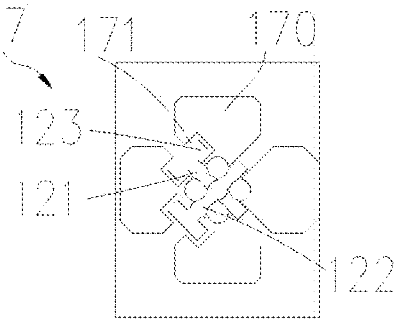
FIG. 24 illustrates a schematic view a fourth kind of structure of parasitic radiation patches according to the second embodiment of the present disclosure.

As shown in FIG. 24, the second groove 171 is communicated with the gap between adjacent two of the parasitic radiation patches 170, and a part of the feeder portion 12 extends into the second groove 171. This embodiment is similar to the embodiment in which the edges of the main radiation patches 110 in the main radiation unit 11 is defined with the first grooves 113, with reference to the embodiment of FIG. 18 for details.

Figure 25:
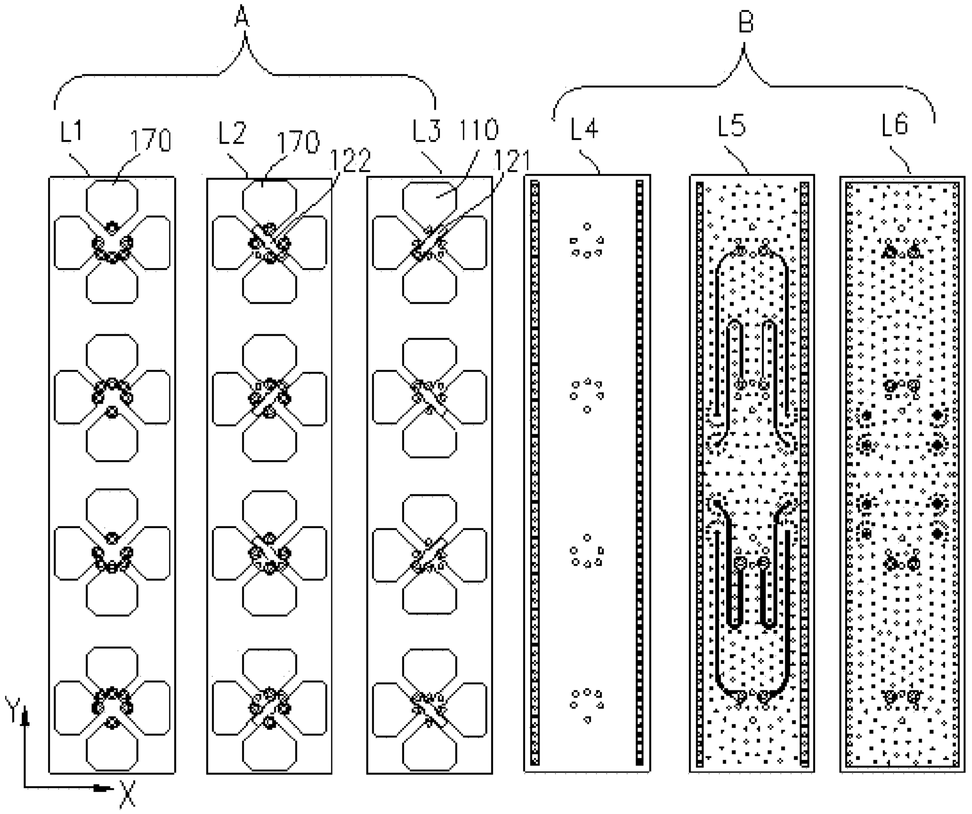
FIG. 25 illustrates schematic structural views of a first conductive layer, a second conductive layer, a third conductive layer, a fourth conductive layer, a fifth conductive layer, and a sixth conductive layer in an antenna module which are laid on a same plane according to a third embodiment of the present disclosure.

As shown in FIG. 25, an antenna module 10 is provided according to a third embodiment of the present disclosure, a second antenna layer B of the third embodiment has the same structure as that of the second antenna layer B of the antenna module 10 according to the first embodiment. In a first antenna layer A according to the third embodiment, the first conductive layer L1 and the second conductive layer L2 are respectively disposed with two layers of parasitic radiation units 17, and the third conductive layer L3 is disposed with main radiation units 11. The first feeder part 121 is disposed in the gap between the main radiation patches 110, and the second feeder part 122 is disposed in the gap between the parasitic radiation patches 170 on the second conductive layer L2.

It should be noted that the layers on which the parasitic radiation units 17 are located are disposed with through holes, which are directly opposite to the first electrically conductive members 15 respectively. These through holes are formed when the first electrically conductive members 15 are processed on the whole plate, and do not mean that the parasitic radiation units 17 are electrically connected to the first electrically conductive members 15.

The first antenna layer A further includes a carrier layer. The carrier layer is disposed between the main radiation layer A1 and the second antenna layer B or disposed on a side of the main radiation layer A1 facing away from the second antenna layer B. In an embodiment, as shown in FIG. 6, when the main radiation layer A1 is the second conductive layer L2, the carrier layer may be the third conductive layer L3 or the first conductive layer L1. The parasitic radiation layer A2 may be a carrier layer or the other layer independent of the carrier layer. When the parasitic radiation layer A2 is not a carrier layer, the parasitic radiation layers A2 may be arranged on the same side of the main radiation layer A1 as the carrier layers, or arranged on opposite sides of the main radiation layer A1, and this disclosure is not limited to this.

The first feeder part 121 and the second feeder part 122 both are long strips.

Arrangement positions of the first feeder part 121 and the second feeder part 122 include but are not limited to the following implementations.

As shown in FIG. 6 and FIG. 7, all of the first feeder part 121 is disposed in the first gap 111 of the main radiation layer A1, and a part of the second feeder part 122 is disposed in the second gap 112, and another part of the second feeder part 122 is disposed on the carrier layer and electrically connected to the part of the second feeder part 122 disposed in the second gap 112. The carrier layer is the third conductive layer L3.

Figure 26:
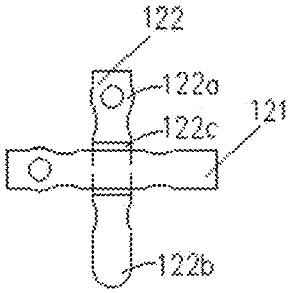
FIG. 26 illustrates a schematic view of a first kind of structure of a feeder portion according to the first embodiment of the present disclosure.

As shown in FIG. 6, FIG. 7, and FIG. 26, the first feeder part 121 is at least partially located in the first gap 111 of the second conductive layer L2. The second feeder part 122 includes two ends 122*a* and 122*b* arranged opposite to each other and a middle part 122*c* connected between the two ends 122*a* and 122*b*. The two ends 122*a* and 122*b* are located on the second conductive layer L2 and disposed on opposite sides of the first feeder part 121 respectively. The middle part 122*c* of the second feeder part 122 is disposed on the carrier layer (i.e., the third conductive layer L3), and the two ends 122*a* and 122*b* are electrically connected to the opposite ends of the middle part 122*c* of the second feeder part 122 through the first vias (blocked). The first vias are disposed along the Z-axis direction.

In order to prevent the first feeder part 121 and the second feeder part 122 from being overlapped, the first feeder part 121 and the second feeder part 122 are arranged in a bridged manner, which effectively improves the isolation of the antenna unit 1, reduces the complexity of the multi-layered structure of the conventional antenna unit, and simplifies the structure of the antenna module 10.

As shown in FIG. 13, in an embodiment, all of the first feeder part 121 is disposed in the first gap 111, and all of the second feeder part 122 is disposed on the carrier layer. The carrier layer is the third conductive layer L3.

In an embodiment, all of the second feeder part 122 is disposed in the second gap 112, and a part of the first feeder part 121 is disposed in the first gap 111, and another part of the first feeder part 121 is disposed on the carrier layer and electrically connected to the part of the first feeder part 121 disposed in the first gap 111.

As shown in FIG. 25, all of the second feeder part 122 is disposed in the second gap 112, and all of the first feeder part 121 is disposed on the carrier layer. The carrier layer is the parasitic radiation layer A2.

Figure 27:
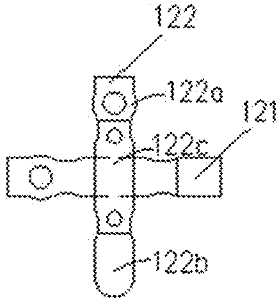
FIG. 27 illustrates a schematic view of a second kind of structure of a feeder portion according to the first embodiment of the present disclosure.

As shown in FIG. 27, when the first feeder part 121 is disposed on the second conductive layer L2, the two ends 122*a* and 122*b* of the second feeder part 122 are disposed on the second conductive layer L2 and are respectively located on opposite sides of the first feeder part 121. The middle part 122*c* of the second feeder part 122 is disposed on the first conductive layer L1.

The structural improvement of the feeder portion 12 will be described below in conjunction with the first embodiment.

Figure 28:
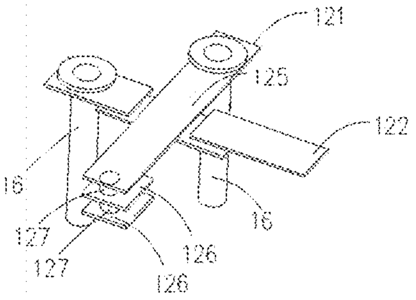
FIG. 28 illustrates a schematic view of a third kind of structure of a feeder portion according to the first embodiment of the present disclosure.

In an embodiment, as shown in FIG. 28, the first feeder part 121 includes a main body part 125 and at least one extension part 126 connected to the main body part 125. The main body part 125 is disposed in the first gap 111. The extension part 126 is disposed on the carrier layer (i.e., third conductive layer L3). An orthogonal projection of the main body part 125 on the carrier layer at least partially covers the extension part 126. The extension part 126 is electrically connected to the main body part 125 through a second via 127.

In an embodiment, the number of the extension parts 126 is multiple, the multiple extension parts 126 are stacked along the Z-axis direction, and adjacent two of the extension parts 126 are electrically connected through the second vias 127. Of course, the second feeder part 122 can also be improved as described above, and will not be described again here.

By arranging the first feeder part 121 to be stacked, and layers thereof are connected through the second vias 127, the extension parts 126 and the second vias 127 are equivalent to the introduction of reactance, which can not only to adjust the impedance of the first feeder part 121, thereby improving the impedance matching of the antenna unit 1, but also to adjust the frequency corresponding to a mode generated by the antenna unit 1 by changing the height and number of the second vias 127.

Figure 29:
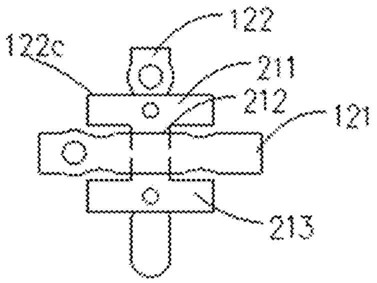
FIG. 29 illustrates a schematic view of a fourth kind of structure of a feeder portion according to the first embodiment of the present disclosure.

In an embodiment, as shown in FIG. 29, the middle part 122*c* of the second feeder part 122 includes a first edge block 211, a middle block 212, and a second edge block 213 connected sequentially in that order. An extension direction of the middle block 212 is the same as that of the second gap 112. Extension directions of the first edge block 211 and the second edge block 213 are the same as the extension direction of the first gap 111. An orthogonal projection of the first feeder part 121 on the carrier layer is located between the first edge block 211 and the second edge block 213.

In this way, the middle part 122*c* of the second feeder part 122 is H-shaped, and the structure of the second feeder part 122 is improved to introduce reactance, which can not only adjust the impedance of the second feeder part 122, thereby improving the impedance matching of the antenna unit 1, but also adjust the frequency corresponding to the mode generated by the antenna unit 1 by changing sizes of the first edge block 211, the middle block 212 and the second edge block 213.

Of course, the above improvement is also applicable to the first feeder part 121.

Figure 30:
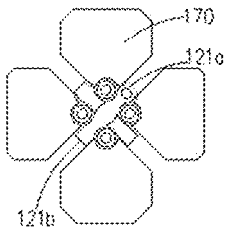
FIG. 30 illustrates a schematic view of a fifth kind of structure of a feeder portion according to the first embodiment of the present disclosure.

In an embodiment, as shown in FIG. 30, the second electrically conductive member 16 is electrically connected to a first end 121*a* of the first feeder part 121 and one end of the microstrip 14. A second end 121*b* of the first feeder part 121 is opposite to the first end 121*a* of the first feeder part 121. In an embodiment, the second end 121*b* of the first feeder part 121 and the first end 121*a* of the first feeder part 121 may be symmetrical about a symmetric center of the main radiation patches 110 (i.e., a geometric center of the main radiation unit 11). That is, a distance between the first end 121*a* of the first feeder part 121 and the symmetric center of the main radiation patches 110 is equal to a distance between the second end 121*b* of the first feeder part 121 and the symmetric center of the main radiation patches 110.

Figure 31:
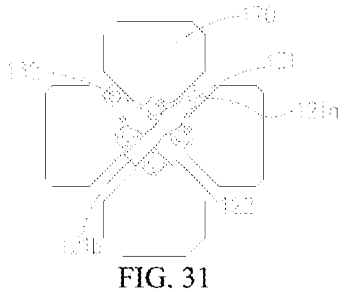
FIG. 31 illustrates a schematic view of a sixth kind of structure of a feeder portion according to the first embodiment of the present disclosure.

As shown in FIG. 31, in other embodiments, a distance between the first end 121*a* of the first feeder part 121 and the symmetric center of the main radiation patches 110 is greater than a distance between the second end 121*b* of the first feeder part 121 and the symmetric center of the main radiation patches 110. Specifically, a connection point between the first feeder part 121 and the second electrically conductive member 16 is defined as a first coupling point 131, and a distance between the first coupling point 131 and the geometric center of the main radiation unit 11 is greater than a distance between the second end 121*b* of the first feeder part 121 and the symmetric center of the main radiation patches 110.

In an embodiment, as shown in FIG. 31, a connection point between the second feeder part 122 and the second electrically conductive member 16 is defined as a second coupling point 132. A distance between the second coupling point 132 and the geometric center of the main radiation unit 11 is greater than a distance between the second end of the second feeder part 122 and the symmetric center of the main radiation patches 110. In this way, compared with the first embodiment, a distance between the first coupling point 131 and the second coupling point 132 is larger in this embodiment, so that the influence of the operation of the first feeder part 121 and the second feeder part 122 is smaller, and the isolation of the first feeder part 121 and the second feeder part 122 is further increased.

In the first embodiment, the first feeder part 121 and the second feeder part 122 both are long strips.

Figure 32:
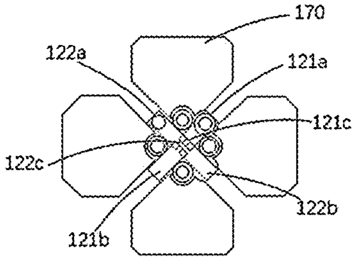
FIG. 32 illustrates a schematic view of a seventh kind of structure of a feeder portion according to the first embodiment of the present disclosure.

As shown in FIG. 32, in other embodiments, orthogonal projections of middle part 121*c* of the first feeder part 121 and the middle part 122*c* of the second feeder part 122 are overlapped on the main radiation layer A1. A width of the middle part 121*c* of the first feeder part 121 in a first direction is smaller than a width of each of two ends 121*a* and 121*b* of the first feeder part 121 in the first direction, and/or the width of the middle part 122*c* of the second feeder part 122 in a second direction is smaller than the width of each of the two ends 122*a* and 122*b* of the second feeder part 122 in the second direction. The first direction is an extension direction of the second gap 112 and the second direction is an extension direction of the first gap 111.

In this embodiment, a part where the projections of the first feeder part 121 and the second feeder part 122 overlapped is relatively thin, so that the impedance of the first feeder part 121 and the second feeder part 122 can be adjusted, thereby the impedance matching of the antenna unit 1 at the required frequency point can be adjusted consequently.

Figure 33:
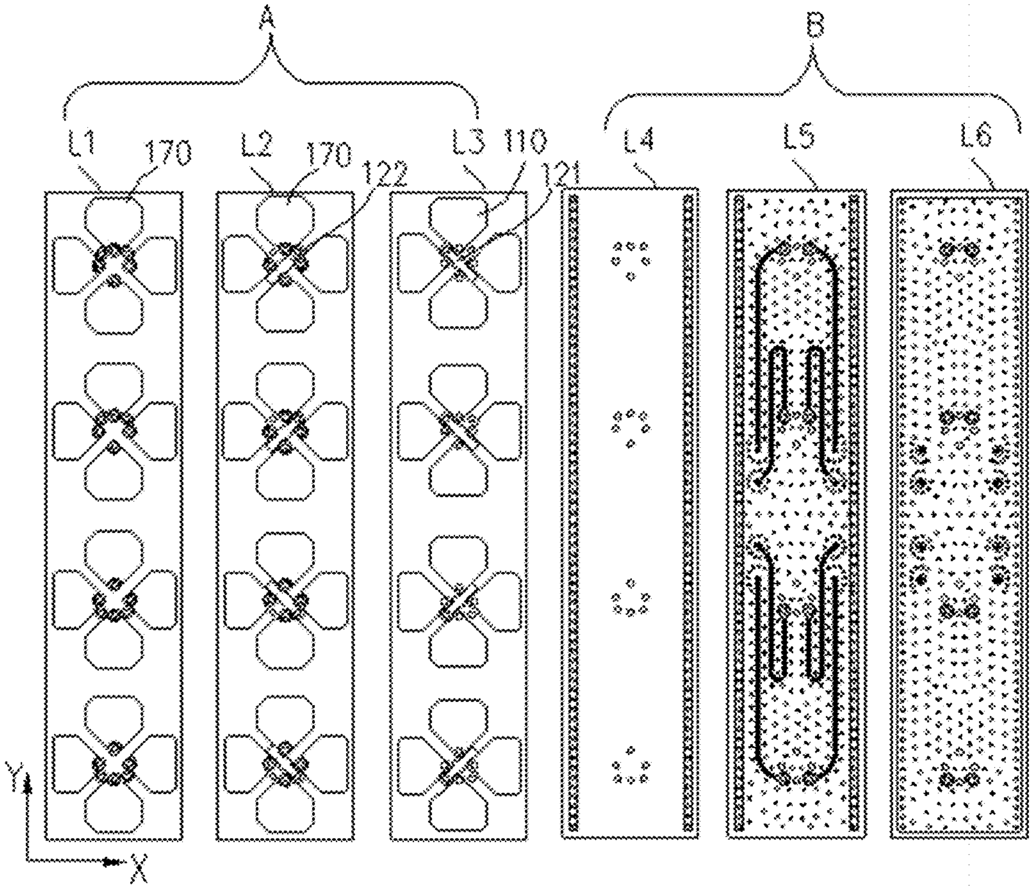
FIG. 33 illustrates schematic structural views of a first conductive layer, a second conductive layer, a third conductive layer, a fourth conductive layer, a fifth conductive layer, and a sixth conductive layer in an antenna module which are laid on a same plane according to a fourth embodiment of the present disclosure.

As shown in FIG. 33, an antenna module 10 is provided according to a fourth embodiment of the present disclosure. The structure of the antenna module 10 according to the fourth embodiment is substantially the same as that of the third embodiment, and the main difference is that the arrangement of the feeder portion of each main radiation unit 11 is different.

Figure 34:
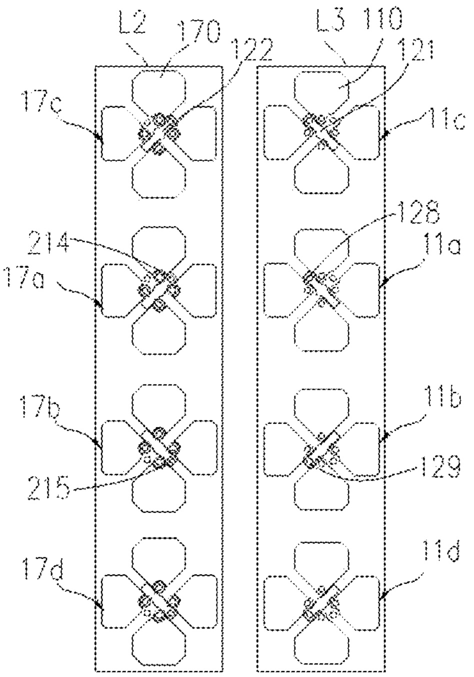
FIG. 34 illustrates schematic structural views of the second conductive layer and the third conductive layer of FIG. 33.

In an embodiment, as shown in FIG. 34, on the third conductive layer L3, the at least one main radiation unit 11 includes a third main radiation unit 11*c*, a first main radiation unit 11*a*, a second main radiation unit 11*b*, and a fourth main radiation unit 11*d* arranged sequentially in that order along the Y-axis direction. A connection point between the first feeder part 121 coupled to the first main radiation unit 11*a* and the second electrically conductive member 16 is a first feeding point 128. A connection point between the first feeder part 121 coupled to the second main radiation unit 11*b* and the second electrically conductive member 16 is a second feeding point 129. A distance between the first feeding point 128 and the second feeding point 129 is greater than a distance between a geometric center of the first main radiation unit 11*a* and a geometric center of the second main radiation unit 11*b*.

Specifically, in FIG. 34, the first feeding point 128 is located at an upper left corner of the feeder portion 12, and the second feeding point 129 is located at a lower left corner of the feeder portion 12. In this way, the distance between the first feeding point 128 and the second feeding point 129 can be as large as possible to reduce the coupling degree between the first feeding point 128 and the second feeding point 129 to thereby improve the isolation thereof.

In FIG. 34, a connection point between the first feeder part 121 coupled to the third main radiation unit 11*c* and the second electrically conductive member 16 is located at the upper left, and the connection point between the first feeder part 121 coupled to the fourth main radiation unit 11*d* and the second electrically conductive member 16 is located at the lower left. In this way, the distance between the feeding points of each main radiation unit 11 is increased as much as possible to increase the isolation.

It can be understood that, as shown in FIG. 34, on the second conductive layer L2, a connection point between the second feeder part 122 coupled to a first parasitic radiation unit 17*a* (opposite to the first main radiation unit 11*a*) and the second electrically conductive member 16 is defined as a third feeding point 214, and a connection point between the second feeder part 122 coupled to a second parasitic radiation unit 17*b* (opposite to the second main radiation unit 11*b*) and the second electrically conductive member 16 is defined as a fourth feeding point 215. A distance between the third feeding point 214 and the fourth feeding point 215 is greater than a distance between a geometric center of first parasitic radiation patches 170 and a geometric center of second parasitic radiation patches 170.

Specifically, in FIG. 34, the third feeding point 214 is located at an upper right corner of the feeder portion 12, and the fourth feeding point 215 is located at a lower right corner of the feeder portion 12. In this way, the distance between the third feeding point 214 and the fourth feeding point 215 can be as large as possible to reduce the coupling degree between the third feeding point 214 and the fourth feeding point 215 to thereby improve the isolation.

In FIG. 34, a connection point between the second feeder part 122 coupled to a third parasitic radiation unit 17*c* and the second electrically conductive member 16 is located at the upper right, and a connection point between the second feeder part 122 coupled to a fourth parasitic radiation unit 17*d* and the second electrically conductive member 16 is located at the lower right. In this way, a distance between the feeding points of each parasitic radiation unit 17 is increased as much as possible to thereby increase the isolation.

Figure 35:
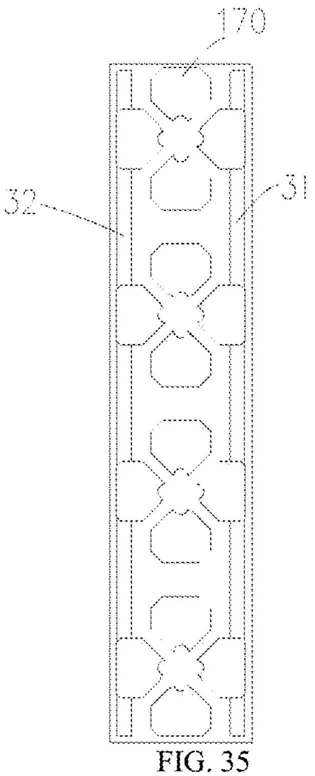
FIG. 35 illustrates a schematic view showing a first kind of structure of metal barriers according to the first embodiment of the present disclosure.

In an embodiment, as shown in FIG. 13 and FIG. 35, the second antenna layer B further includes a first metal barrier 31 and a second metal barrier 32 arranged opposite to each other. The first metal barrier 31 and the second metal barrier 32 are disposed between the main radiation unit 11 and the reference ground 13. The first metal barrier 31 and the second metal barrier 32 both extend in an arrangement direction of the main radiation units 11. The first metal barrier 31 and the second metal barrier 32 are respectively close to two opposite edges of the antenna module 10. Orthographic projections of the main radiation units 11 (or the parasitic radiation units 17) on the second antenna layer B partially cover between the first metal barrier 31 and the second metal barrier 32.

In this embodiment, the first metal barrier 31 and the second metal barrier 32 both are disposed on the fourth conductive layer L4. The first metal barrier 31 and the second metal barrier 32 are respectively disposed at edges of the fourth conductive layer L4.

The first metal barrier 31 may be a row of metal vias penetrating through the reference ground 13 of the fifth conductive layer L5 to thereby be electrically connected the first metal barrier 31 with the reference ground 13. The first metal barrier 31 may also be a metal sheet. The structure of the second metal barrier 32 may refer to the structure of the first metal barrier 31 and will not be described here.

The first metal barrier 31 and the second metal barrier 32 both form reflection walls of electromagnetic waves, and are used to change the current distribution on the main radiation unit 11 to make an electric field shape more concentrated, thereby increasing the gain.

Figure 36:
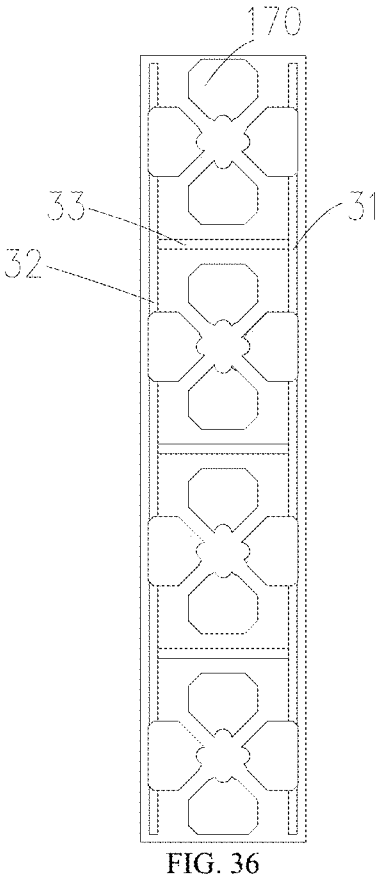
FIG. 36 illustrates a schematic view showing a second kind of structure of metal barriers according to the first embodiment of the present disclosure.

In an embodiment, as shown in FIG. 36, the second antenna layer B further includes at least one third metal barrier 33. The third metal barrier 33 is located between the orthographic projections of adjacent two of the main radiation units 11 (or parasitic radiation units 17) on the second antenna layer B.

The third metal barrier 33 may be located on the fourth conductive layer L4, and the third metal barrier 33 is located between the orthographic projections of the adjacent two of the main radiation units 11 (or parasitic radiation units 17) on the fourth conductive layer L4, so that the third metal barrier 33 is an isolation barrier between the adjacent two of the main radiation units 11, thereby improving the isolation between the adjacent two of the main radiation units 11.

In an embodiment, the third metal barrier 33 may be elongated on the X-Y plane and extend along the X-axis direction. Two ends of the third metal barrier 33 are electrically connected to the first metal barrier 31 and the second metal barrier 32 respectively.

Figure 37:
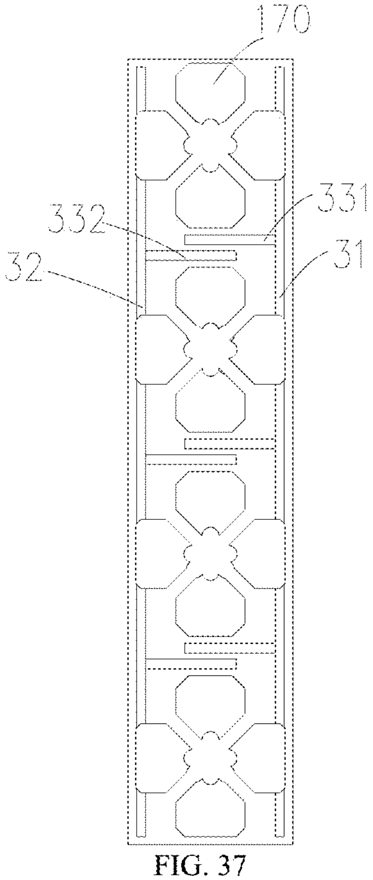
FIG. 37 illustrates a schematic view showing a third kind of structure of metal barriers according to the first embodiment of the present disclosure.

In an embodiment, as shown in FIG. 37, the third metal barrier 33 may include a first barrier 331 and a second barrier 332. The first barrier 331 and the second barrier 332 may be elongated on the X-Y plane and extend along the X-axis direction. The first barrier 331 is electrically connected to the first metal barrier 31 and spaced apart from the second metal barrier 32. The second barrier 332 is electrically connected to the second metal barrier 32 and spaced apart from the first metal barrier 31. The first barrier 331 and the second barrier 332 are overlapped in the Y-axis direction but are spaced apart from each other.

Figure 38:
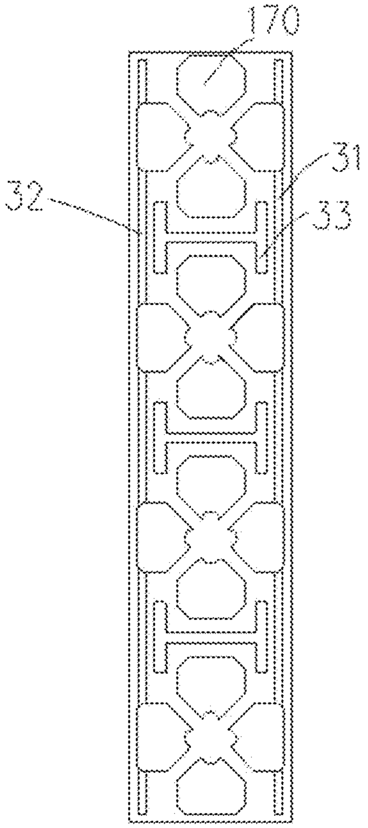
FIG. 38 illustrates a schematic view showing a fourth kind of structure of metal barriers according to the first embodiment of the present disclosure.

In an embodiment, as shown in FIG. 38, the third metal barrier 33 is turned by 90 degrees on the X-Y plane to thereby being presented as a H-shaped. The multiple H-shaped structures are arranged along the Y-axis direction.

By providing the third metal barrier 33 in a H-shaped structure turned by 90 degrees, not only the isolation between adjacent main radiation units 11 can be increased, but also the third metal barrier 33 can make full use of a space between the main radiation units 11.

Figure 39:
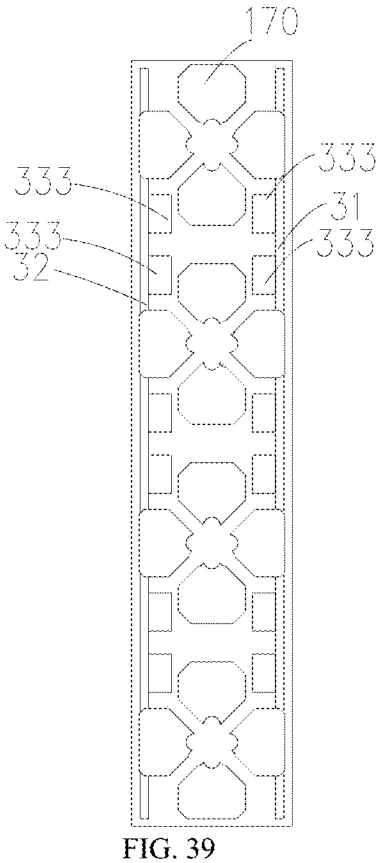
FIG. 39 illustrates a schematic view showing a fifth kind of structure of metal barriers according to the first embodiment of the present disclosure.

In an embodiment, as shown in FIG. 39, the third metal barrier 33 includes at least two metal blocks 333 spaced apart from each other. The number of metal blocks 333 being four is taken as an example for description. The two metal blocks 333 are electrically connected to the first metal barrier 31 and the second metal barrier 32 respectively, and are close to opposite sides of one main radiation patch 110 in one main radiation unit 11. The other two metal blocks 333 are electrically connected to the first metal barrier 31 and the second metal barrier 32 respectively, and are close to opposite sides of one main radiation patch 110 of the other main radiation unit 11.

Figure 40:
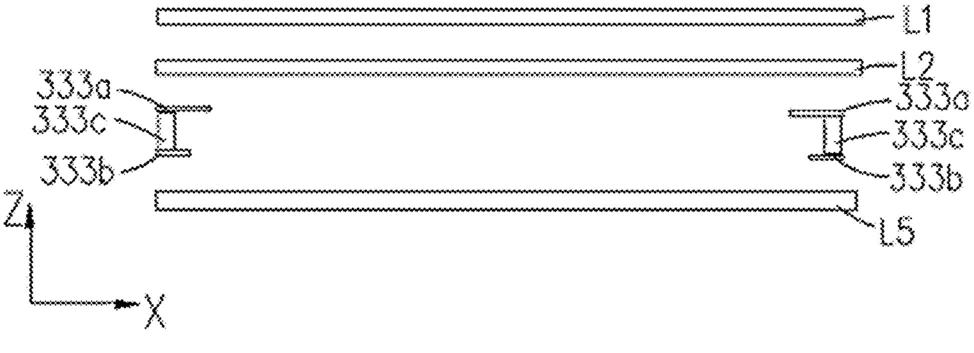
FIG. 40 illustrates a schematic side view of the metal barrier of FIG. 39.

In an embodiment, as shown in FIG. 40, the metal block 333 may include a first metal piece 333*a* and a first metal piece 333*b* arranged in layers, where the first metal piece 333*a* and the first metal piece 333*b* are arranged in layers along the Z-axis direction, and are electrically connected to each other through a metal via 333*c*.

The materials of the first metal barrier 31, the second metal barrier 32, and the third metal barrier 33 may be the same as those of the reference ground 13.

Figure 41:
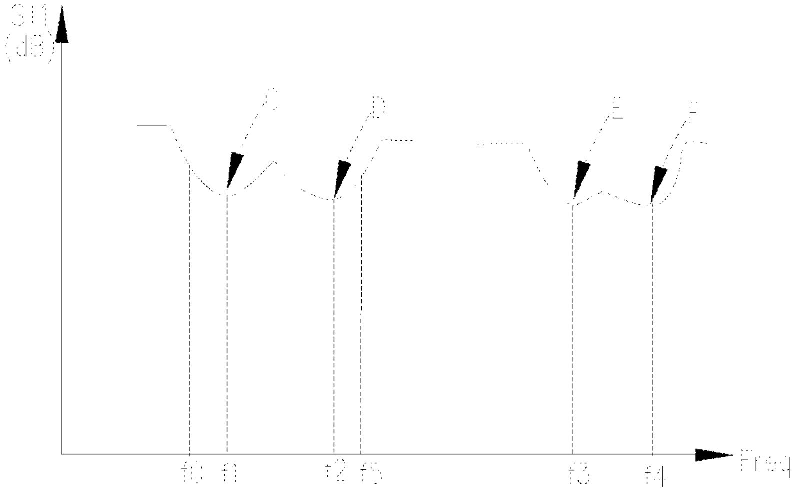
FIG. 41 illustrates a schematic curve diagram of input return loss (S11) and frequency of the antenna module according to the first embodiment of the present disclosure.

FIG. 41 illustrates a schematic curve diagram of input return loss (S11) and frequency of the antenna module according to the first embodiment of the present disclosure. A point C corresponding to a frequency f1 is a resonance point generated by the electric dipole, a point D corresponding to a frequency f2 is a resonance point generated by the matching network, a point E corresponding to a frequency f3 is a resonance point generated by the magnetic dipole, and a point F corresponding to a frequency f4 is a resonance point generated by the matching network. It can be seen that the matching network according to the embodiment of the present disclosure can widen the bandwidth of the electric dipole and the magnetic dipole. In addition, the point C may also correspond to the frequency f2, while the point D corresponds to the frequency f1. Similarly, for example, the point E may correspond to the frequency f4, while the point F corresponds to the frequency f3. For example, the frequency f0-f5 is the bandwidth widened by the matching network acting on the electric dipole. Moreover, the combination of the electric dipole and the magnetic dipole can increase the bandwidth of the antenna module 10.

The antenna module 10 according to the embodiment of the present disclosure combines the electric dipole and the magnetic dipole to thereby obtain a magneto-electric dipole, thereby improving the antenna bandwidth and reducing the thickness of the antenna module 10, and can be flexibly applied in various communication products. By arranging the microstrip 14 between the feeder portion 12 and the RF transceiver chip 2, the impedance can be adjusted by designing the length of the microstrip 14, and the impedance matching of the antenna unit 1 at the working frequency point can be adjusted consequently. By changing the clearance dimension around the end section 141 of the microstrip 14, the impedance mismatch caused by the impedance discontinuity of the vertical interconnection with vias can be optimized, so as to reduce the transmission loss. The antenna unit 1 with rotating magnetoelectric dipole is adopted to thereby reduce the scanning loss. The antenna gain is improved by the double-layer parasitic radiation unit 17 so that the antenna size is reduced without sacrificing the gain of the antenna. By increasing the spacing between the feeding points of adjacent two antenna units 1, the antenna isolation is improved and the scanning loss is further reduced. The antenna gain is improved by setting the metal barriers.

The above are some embodiments of the present disclosure. It should be noted out that, for those skilled in the related art, several improvements and modifications can be made without departing from the principles of the present disclosure, and these improvements and modifications are also considered as the scope of protection of the present disclosure.

What is claimed is:

1. An antenna module, comprising:

a first antenna layer, comprising at least one main radiation unit and at least one feeder portion, wherein the main radiation unit comprises at least two main radiation patches symmetrically arranged and spaced apart from each other, the feeder portion is disposed in or arranged corresponding to a gap between adjacent two of the main radiation patches, and the feeder portion is electrically connected or coupled to the main radiation patches;

a second antenna layer, stacked with the first antenna layer and comprising a reference ground and at least one microstrip, wherein the reference ground is arranged opposite to the main radiation patches, the microstrip is disposed on a layer where the reference ground is located, disposed between the reference ground and the main radiation patches or disposed on a side of the reference ground facing away from the main radiation patches, the microstrip is insulated from the reference ground, and a first end of the microstrip is configured to be electrically connected to a radio frequency (RF) transceiver chip;

at least one first conductive member, electrically connected to the main radiation patches and the reference ground; and at least one second conductive member, wherein an end of the second conductive member is electrically connected to the feeder portion and another end of the second conductive member is electrically connected to a second end of the microstrip;

wherein the second antenna layer is defined with at least one hollow portion enclosed by the reference ground, and the microstrip is disposed in the hollow portion and spaced apart from the reference ground; and wherein the microstrip comprises two end sections opposite to each other and a middle section connected between the two end sections, and a spacing between each of the end sections and the reference ground is greater than a spacing between the middle section and the reference ground.

2. The antenna module according to claim 1, wherein the middle section comprises at least one body portion and at least one widened portion interconnected in an extension direction, and a line width of the widened portion is greater than that of the body portion.

3. The antenna module according to claim 1, wherein the microstrip further comprises at least one branch electrically connected to the middle section, the branch extends in a direction inclined or perpendicular with respect to the middle section, and an end of the branch facing away from the middle section is open-circuited.

4. The antenna module according to claim 1, wherein the first antenna layer further comprises a main radiation layer, the main radiation unit is disposed on the main radiation layer, a number of the main radiation patches in one main radiation unit is multiple, the multiple main radiation patches are centrosymmetrically arranged, and a first gap and a second gap intersecting with each other are formed among the multiple main radiation patches, wherein the feeder portion comprises a first feeder part and a second feeder part insulated from each other, the first feeder part is disposed in or arranged corresponding to the first gap, the second feeder part is disposed in or arranged corresponding to the second gap, and orthographic projections of the first feeder part and the second feeder part on the main radiation layer are intersected.

5. The antenna module according to claim 4, wherein the first antenna layer further comprises a carrier layer disposed between the main radiation layer and the second antenna layer or disposed on a side of the main radiation layer facing away from the second antenna layer; and a relationship among the first feeder part, the second feeder part, the first gap, the second gap and the carrier layer comprises one selected from the group consisting of the following four cases:

all of the first feeder part is disposed in the first gap, a part of the second feeder part is disposed in the second gap, and another part of the second feeder part is disposed on the carrier layer and electrically connected to the part of the second feeder part disposed in the second gap;

all of the first feeder part is disposed in the first gap, and all of the second feeder part is disposed on the carrier layer;

all of the second feeder part is disposed in the second gap, and a part of the first feeder part is disposed in the first gap, and another part of the first feeder part is disposed on the carrier layer and electrically connected to the part of the first feeder part disposed in the first gap; and all of the second feeder part is disposed in the second gap, and all of the first feeder part is disposed on the carrier layer.

6. The antenna module according to claim 5, wherein the first feeder part is at least partially disposed in the first gap, the second feeder part comprises two ends opposite to each other and a middle part connected between the two ends, the two ends are disposed in the second gap and are respectively located on opposite sides of the first feeder part, the middle part of the second feeder part is disposed on the carrier layer, and the two ends are electrically connected to opposite ends of the middle part of the second feeder part through first vias respectively.

7. The antenna module according to claim 6, wherein the first feeder part comprises a main body part and at least one extension part connected to the main body part, the main body part is disposed in the first gap, the extension part is disposed on the carrier layer, an orthogonal projection of the main body part on the carrier layer at least partially covers the extension part, and the extension part is electrically connected to the main body part through a second via.

8. The antenna module according to claim 6, wherein the middle part of the second feeder part comprises a first edge block, a middle block, and a second edge block sequentially connected in that order, an extension direction of the middle block is the same as an extension direction of the second gap, extension directions of the first edge block and the second edge block are the same as an extension direction of the first gap, and an orthogonal projection of the first feeder part on the carrier layer is located between the first edge block and the second edge block.

9. The antenna module according to claim 4, wherein a first end of the first feeder part is electrically connected to the second end of the microstrip through the second conductive member, a second end of the first feeder part is opposite to the first end of the first feeder part, and a distance between the first end of the first feeder part and a geometric center of the main radiation unit is greater than a distance between the second end of the first feeder part and the geometric center of the main radiation unit.

10. The antenna module according to claim 4, wherein an orthographic projection of a middle part of the first feeder part and a middle part of the second feeder part on the main radiation layer are overlapped;

wherein a width of the middle part of the first feeder part in a first direction is smaller than a width of each of two ends of the first feeder part in the first direction; and/or, a width of the middle part of the second feeder part in a second direction is smaller than a width of each of the two ends of the second feeder part in the second direction;

wherein the first direction is an extension direction of the second gap, and the second direction is an extension direction of the first gap.

11. The antenna module according to claim 1, wherein the at least one main radiation unit comprises a first main radiation unit and a second main radiation unit, a connection point between the feeder portion coupled to the first main radiation unit and the second conductive member is a first feeding point, a connection point between the feeder portion coupled to the second main radiation unit and the second conductive member is a second feeding point, and a distance between the first feeding point and the second feeding point is greater than a distance between a geometric center of the first main radiation unit and a geometric center of the second main radiation unit.

12. The antenna module according to claim 4, wherein a number of the least one main radiation unit is multiple, the multiple main radiation units are arranged along a third direction, an included angle between an extension direction of the first gap and the third direction is in a range of 0 to 45°, and an included angle between an extension direction of the second gap and the third direction is in a range of 0 to 45°.

13. The antenna module according to claim 1, wherein an edge of at least one of the main radiation patches of the main radiation unit is defined with at least one first groove or at least one first protrusion.

14. The antenna module according to claim 13, wherein the main radiation patch comprises a first end and a second end opposite to each other, the first end is close to a geometric center of the main radiation unit, and the first groove is defined at the second end and extends towards the first end.

15. The antenna module according to claim 13, wherein the first groove is communicated with the gap between adjacent two of the main radiation patches;

wherein the main radiation unit comprises a first main radiation patch and a second main radiation patch disposed adjacent to each other, and each of the first main radiation patch and the second main radiation patch is defined with the first groove; and wherein the feeder portion further comprises a main body section, and a first extension section and a second extension section respectively disposed on opposite sides of the main body section; the main body section is disposed in a gap between the first main radiation patch and the second main radiation patch, and the first extension section and the second extension section are respectively disposed in the first groove of the first main radiation patch and the first groove of the second main radiation patch.

16. The antenna module according to claim 1, wherein the first antenna layer further comprises at least one parasitic radiation layer;

wherein the at least one parasitic radiation layer is disposed between the main radiation layer and the second antenna layer, or located on a side of the main radiation layer facing away from the second antenna layer; or, a number of the at least one parasitic radiation layer is at least two, and the at least two parasitic radiation layers are respectively disposed on opposite sides of the main radiation layer; and wherein the parasitic radiation layer comprises at least one parasitic radiation unit, the parasitic radiation unit comprises at least two parasitic radiation patches arranged symmetrically and spaced apart from each other, and the parasitic radiation patches are arranged opposite to the main radiation patches.

17. The antenna module according to claim 1, wherein the second antenna layer further comprises a first metal barrier and a second metal barrier arranged opposite to each other, the first metal barrier and the second metal barrier are both disposed between the at least one main radiation unit and the reference ground, the first metal barrier and the second metal barrier extend along an arrangement direction of the at least one main radiation unit, the first metal barrier and the second metal barrier are respectively close to two opposite edges of the antenna module, and an orthographic projection of the at least one main radiation unit on the second antenna layer partially cover the first metal barrier and the second metal barrier.

18. The antenna module according to claim 17, wherein the second antenna layer further comprises at least one third metal barrier, and each the third metal barrier is disposed between the orthographic projections of adjacent two of the at least one main radiation unit on the second antenna layer.

19. An electronic device, comprising:

a main board; and an antenna module, comprising:

a first antenna layer, comprising at least one main radiation unit and at least one feeder portion, wherein the main radiation unit comprises at least two main radiation patches symmetrically arranged and spaced apart from each other, the feeder portion is disposed in or arranged corresponding to a gap between adjacent two of the main radiation patches, and the feeder portion is electrically connected or coupled to the main radiation patches;

a second antenna layer, stacked with the first antenna layer and comprising a reference ground and at least one microstrip, wherein the reference ground is arranged opposite to the main radiation patches, the microstrip is disposed on a layer where the reference ground is located, disposed between the reference ground and the main radiation patches or disposed on a side of the reference ground facing away from the main radiation patches, the microstrip is insulated from the reference ground, and a first end of the microstrip is configured to be electrically connected to a RF transceiver chip;

at least one first conductive member, electrically connected to the main radiation patches and the reference ground; and at least one second conductive member, wherein an end of the second conductive member is electrically connected to the feeder portion and another end of the second conductive member is electrically connected to a second end of the microstrip;

wherein the antenna module is at least partially disposed on the main board or is electrically connected to the main board;

wherein the first antenna layer further comprises a main radiation layer, the main radiation unit is disposed on the main radiation layer, a number of the main radiation patches in one main radiation unit is multiple, the multiple main radiation patches are centrosymmetrically arranged, and a first gap and a second gap intersecting with each other are formed among the multiple main radiation patches; and wherein the feeder portion comprises a first feeder part and a second feeder part insulated from each other, the first feeder part is disposed in or arranged corresponding to the first gap, the second feeder part is disposed in or arranged corresponding to the second gap, and orthographic projections of the first feeder part and the second feeder part on the main radiation layer are intersected.

20. The electronic device according to claim 19, wherein the second antenna layer is defined with at least one hollow portion enclosed by the reference ground, and the microstrip is disposed in the hollow portion and spaced apart from the reference ground;

wherein the microstrip comprises two end sections opposite to each other and a middle section connected between the two end sections, and a spacing between each of the end sections and the reference ground is greater than a spacing between the middle section and the reference ground.

* * * * *